(12) United States Patent
Kobayashi et al.

(10) Patent No.: US 12,548,337 B2
(45) Date of Patent: Feb. 10, 2026

(54) NOTIFICATION DEVICE, NOTIFICATION METHOD, AND NON-TRANSITORY COMPUTER-READABLE MEDIUM

(71) Applicant: NEC Corporation, Tokyo (JP)

(72) Inventors: Kosei Kobayashi, Tokyo (JP); Tetsuro Hasegawa, Tokyo (JP); Hiroaki Aminaka, Tokyo (JP); Kei Yanagisawa, Tokyo (JP); Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 27 days.

(21) Appl. No.: 18/274,695

(22) PCT Filed: Mar. 29, 2021

(86) PCT No.: PCT/JP2021/013217
§ 371 (c)(1),
(2) Date: Jul. 27, 2023

(87) PCT Pub. No.: WO2022/208586
PCT Pub. Date: Oct. 6, 2022

(65) Prior Publication Data
US 2024/0127595 A1    Apr. 18, 2024

(51) Int. Cl.
*G06V 20/52* (2022.01)
*G06V 20/40* (2022.01)
(Continued)

(52) U.S. Cl.
CPC .............. *G06V 20/52* (2022.01); *G06V 20/41* (2022.01); *G06V 40/172* (2022.01);
(Continued)

(58) Field of Classification Search
CPC ...... G06V 20/52; G06V 20/41; G06V 20/172; G06V 2201/08; G08B 21/0476
See application file for complete search history.

(56) References Cited

U.S. PATENT DOCUMENTS 12,087,412 B1 *   9/2024   Sorkey .................. G16H 10/60
2007/0096886 A1   5/2007   Lich et al.
(Continued)

FOREIGN PATENT DOCUMENTS

JP   H04-057198 A    2/1992
JP   2001-325689 A   11/2001
(Continued)

OTHER PUBLICATIONS

Extended European Search Report for EP Application No. 21934763.0, dated on Feb. 12, 2024.
(Continued)

*Primary Examiner* — Kathleen V Nguyen

(57) ABSTRACT

A notification device according to an example embodiment of the present disclosure includes at least one memory configured to store instructions; and at least one processor configured to execute the instructions to: detect occurrence of an accident from a video captured by one or a plurality of cameras, analyze the video to derive detailed information regarding an analysis target person involved with the accident, determine a coping method for the analysis target person on the basis of the detailed information; and notify the notification target of the determined coping method.

15 Claims, 20 Drawing Sheets

(51) Int. Cl.
  *G06V 40/16*    (2022.01)
  *G08B 21/04*    (2006.01)
  *G08B 25/10*    (2006.01)

(52) U.S. Cl.
  CPC ......... *G08B 21/0476* (2013.01); *G08B 25/10* (2013.01); *G06V 2201/08* (2022.01)

(56) References Cited

U.S. PATENT DOCUMENTS

| | | | |
|---|---|---|---|
| 2007/0159309 A1 | 7/2007 | Ito et al. | |
| 2011/0117878 A1 | 5/2011 | Barash et al. | |
| 2012/0218102 A1* | 8/2012 | Bivens | G08B 25/003 340/539.11 |
| 2015/0147995 A1* | 5/2015 | Bontu | H04W 4/02 455/404.1 |
| 2015/0288797 A1* | 10/2015 | Vincent | G16H 10/60 455/404.2 |
| 2018/0184051 A1 | 6/2018 | Watanabe et al. | |

FOREIGN PATENT DOCUMENTS

| | | |
|---|---|---|
| JP | 2002-008184 A | 1/2002 |
| JP | 2002-123880 A | 4/2002 |
| JP | 2007-094935 A | 4/2007 |
| JP | 2007-538297 A | 12/2007 |
| JP | 2016-096574 A | 5/2016 |
| JP | 2017-024462 A | 2/2017 |
| JP | 2018-110304 A | 7/2018 |
| JP | 2019-003487 A | 1/2019 |
| JP | 2019-101983 A | 6/2019 |
| WO | 2005/101346 A1 | 10/2005 |

OTHER PUBLICATIONS

International Search Report for PCT Application No. PCT/JP2021/013217, mailed on Jun. 8, 2021.
JP Office Action for JP Application No. 2024-140956, mailed on Jul. 8, 2025 with English Translation,.
JP Office Action for JP Application No. 2024-140956, mailed on Nov. 4, 2025 with English Translation.

* cited by examiner

NOTIFICATION DEVICE, NOTIFICATION METHOD, AND NON-TRANSITORY COMPUTER-READABLE MEDIUM

This application is a National Stage Entry of PCT/JP2021/013217 filed on Mar. 29, 2021, the contents of all of which are incorporated herein by reference, in their entirety.

TECHNICAL FIELD

The present invention relates to a notification device, a notification system, a notification method, and a non-transitory computer-readable medium.

BACKGROUND ART

In a case where an accident occurs, a technique of detecting the occurrence of the accident and coping with the accident is considered.

For example, Patent Literature 1 discloses a recording and analyzing system that temporarily records acoustic data and video data in a data recording device in a case where input acoustic data is due to a traffic accident, and classifies and analyzes the traffic accident on the basis of the recorded data.

Patent Literature 2 discloses a content generation device that selects a content candidate to be transmitted to a reporter who has made an emergency request on the basis of a state of a patient who is an emergency target when the emergency request is made from a terminal of the reporter.

Patent Literature 3 discloses a system that, in a case where there is a notification that a specific person has a medical problem, specifies a current location of the specific person and notifies a registered user in a region around the current location of the position of the specific person.

CITATION LIST

Patent Literature

Patent Literature 1: International Patent Publication No. WO 2005/101346A
Patent Literature 2: Japanese Unexamined Patent Application Publication No. 2019-101983
Patent Literature 3: Japanese Unexamined Patent Application Publication No. 2016-096574

SUMMARY OF INVENTION

Technical Problem

An object of the present disclosure is to provide a notification device, a notification system, a notification method, and a non-transitory computer readable medium capable of realizing quick initial response with respect to an analysis target person such as an injured person or an urgent case.

Solution to Problem

According to one aspect of the present example embodiment, there is provided a notification device including at least one memory configured to store instructions; and at least one processor configured to execute the instructions to: detect occurrence of an accident from a video captured by one or a plurality of cameras; analyze the video to derive detailed information regarding an analysis target person involved with the accident; determine a coping method for coping with the analysis target person on the basis of the detailed information; and notify a notification target of the determined coping method.

According to one aspect of the present example embodiment, there is provided a notification system including one or a plurality of cameras; a notification device that is connected to the one or plurality of cameras; and one or a plurality of terminals that receive a notification from the notification device, in which the notification device includes at least one memory configured to store instructions; and at least one processor configured to execute the instructions to: detect occurrence of an accident from a video captured by the one or plurality of cameras, analyze the video to derive detailed information regarding an analysis target person involved with the accident, determine a coping method for coping with the analysis target person on the basis of the detailed information, and notify the one or plurality of terminals of the determined coping method.

According to one aspect of the present example embodiment, there is provided a notification method of causing a notification device to execute detecting occurrence of an accident from a video captured by one or a plurality of cameras; analyzing the video to derive detailed information regarding an analysis target person involved with the accident; determining a coping method for coping with the analysis target person on the basis of the detailed information; and notifying a notification target of the determined coping method.

According to one aspect of the present example embodiment, there is provided a non-transitory computer-readable medium storing a program for causing a computer to execute detecting occurrence of an accident from a video captured by one or a plurality of cameras; analyzing the video to derive detailed information regarding an analysis target person involved with the accident; determining a coping method for coping with the analysis target person on the basis of the detailed information; and notifying a notification target of the determined coping method.

Advantageous Effects of Invention

According to the present disclosure, it is possible to provide a notification device, a notification system, a notification method, and a non-transitory computer readable medium capable of realizing a quick initial response with respect to an analysis target person such as an injured person or an urgent case.

EXAMPLE EMBODIMENT

First Example Embodiment (1A)

Hereinafter, a first example embodiment of the present disclosure will be described with reference to the drawings. In (1A), a notification device that detects the occurrence of an accident and notifies a notification target thereof will be described.

Figure 1:
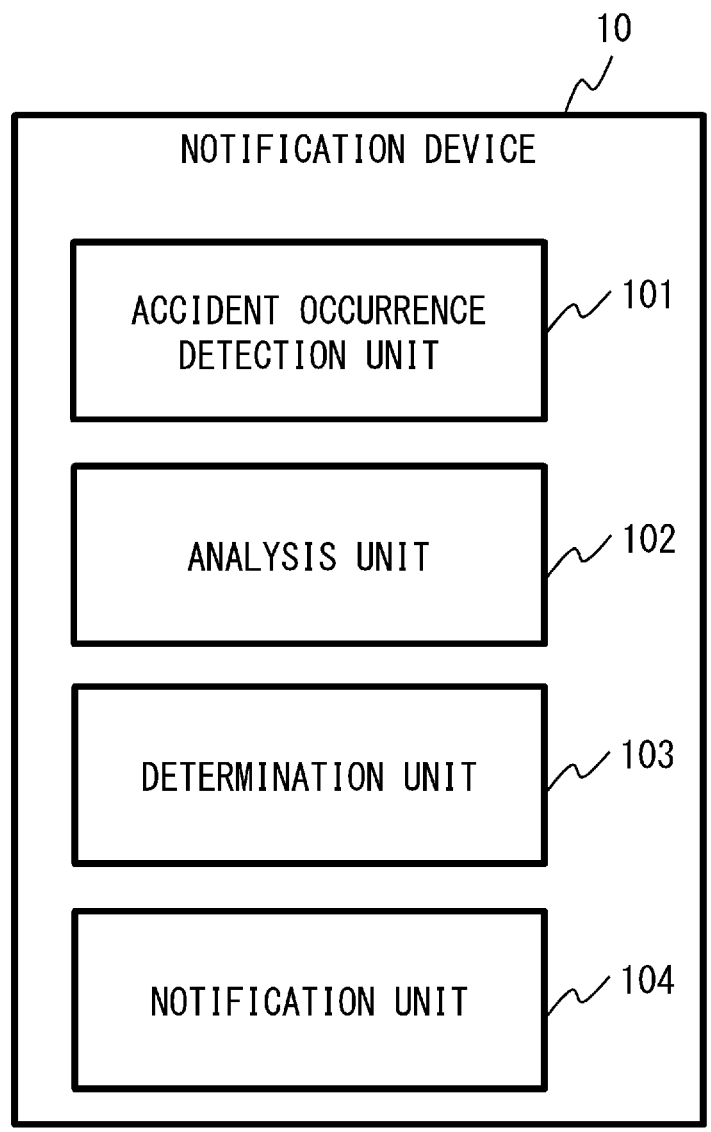
FIG. 1 is a block diagram illustrating an example of a notification device according to a first example embodiment.

FIG. 1 is a block diagram illustrating an example of a notification device. A notification device 10 includes an accident occurrence detection unit 101, an analysis unit 102, a determination unit 103, and a notification unit 104. Each unit (each means) of the notification device 10 is controlled by a control unit (controller) (not illustrated). Hereinafter, each constituent will be described.

The accident occurrence detection unit 101 detects the occurrence of an accident from videos captured by one or a plurality of cameras. Note that, in the present disclosure, "accident" means an incident in which an injured person or an urgent case occurs regardless of accidental or intentional, and includes, for example, an accident between a vehicle and a person, an accident between persons, an accident between vehicles, and a sudden deterioration of a medical condition, but is not limited thereto. When detecting an accident, the accident occurrence detection unit 101 may determine the type of an accident such as a collision accident, a fire, or worsening of a chronic disease. The "video" may be any data of a moving image and a still image.

One or a plurality of cameras may be provided at any place. In a case where a plurality of cameras are provided, for example, a plurality of cameras may image a certain predetermined place from different directions, or a plurality of cameras may image different places. The accident occurrence detection unit 101 detects that an accident has occurred in one or a plurality of places by analyzing videos captured by one or a plurality of cameras. As the camera, one or more types of cameras such as a visible light camera, an infrared camera, and a thermo camera may be freely combined and used. Note that the accident occurrence detection unit 101 may specify a position of the accident site on the basis of at least one of a position of the camera that is determined to have imaged the occurrence of the accident or a range in which the accident has occurred in the video data.

In a case where the accident occurrence detection unit 101 detects the occurrence of an accident, the analysis unit 102 derives detailed information regarding an injured person or an urgent case (hereinafter, an analysis target person) caused by the accident by analyzing a video in which the occurrence of the accident is detected. Note that, instead of the video in which the occurrence of the accident is detected or in addition to the video in which the occurrence of the accident is detected, the analysis unit 102 may analyze the video including the position of the accident site in an imaging range to derive the detailed information regarding the analysis target person. The analysis unit 102 derives the detailed information on the basis of video data of the camera during a period from about a timing at which the accident occurrence detection unit 101 detects the occurrence of the accident to the time at which the analysis processing is performed, or captured videos of the camera at one or a plurality of timings. The detailed information indicates, for example, at least one of information regarding a body condition of the analysis target person or personal information of the analysis target person in the accident, but is not limited thereto.

The information regarding the body condition of the analysis target person includes, as an example, at least one of a consciousness state, a respiratory state, a bleeding state, a fracture state, a burn state, a strong hit site, a spasm state, a walking state, a heartbeat state, a pulse state, or a body temperature state of the analysis target person. Specifically, the consciousness state may indicate at least one of the presence or absence of consciousness or the degree of cloudiness of consciousness, the respiratory state may indicate at least one of the presence or absence of respiration or the degree of normality of respiration, the bleeding state may indicate at least one of the presence or absence, a location, or the degree of bleeding, and the fracture state may indicate at least one of the presence or absence, a location, or the degree of fracture. The burn state may indicate at least one of the presence or absence, a location, or the degree of a burn, the strong hit site may indicate at least one of a location where a strong hit is made or the degree of the strong hit, the spasm state may indicate at least one of the presence or absence or the degree of spasm, the walking state may indicate at least one of the degree of wobble or the degree of normality of walking, the heartbeat state may indicate at least one of the presence or absence, a frequency, or the degree of normality of heartbeat, and the pulse state may indicate at least one of the presence or absence, a frequency, or the degree of normality of a pulse. The body temperature state may indicate at least one of the presence or absence of fever, a temperature, or a location.

The analysis unit 102 may directly or indirectly derive the detailed information on the basis of the video of the analysis target person itself. For example, the analysis unit 102 may derive the detailed information by directly determining a bleeding state from a state in which the analysis target person is bleeding in the video. In another example, even if the analysis target person does not have a state of external injury, in a case where the analysis target person limps and a painful expression appears on the face of the analysis target person, the analysis unit 102 can indirectly estimate that the analysis target person has a broken leg or a bruise on the leg to derive the detailed information.

The analysis unit 102 may derive the detailed information by using not only the video of the analysis target person itself but also other videos showing a state of occurrence of the accident. For example, in a case where a state in which an object is scattered due to an explosion accident is captured by a camera that has imaged the analysis target person or a camera different from the camera, the analysis unit 102 can analyze a state of the occurrence of the accident, determine that the analysis target person has been hit by an object that has been subjected to a blast or blown by the blast, and estimate that at least one of bleeding, fracture, or bruising has occurred in the analysis target person.

The analysis unit 102 may derive the detailed information by further using other information such as information regarding the type of the accident determined by the accident occurrence detection unit 101 and an attribute of a pre-registered area in which the camera that has imaged the accident is provided. For example, in a case where the accident occurrence detection unit 101 determines that the accident is a fire, the analysis unit 102 can determine that the analysis target person has a burn injury after taking the information into consideration in the analysis of the video.

The analysis unit 102 may control a camera that captures a video in order to derive accurate detailed information. For example, in order to increase a spatial or temporal imaging resolution, the camera may be controlled to increase an imaging magnification, increase a resolution, increase a frame rate, increase a quantization bit rate, increase a bit rate, or the like. As a result, the camera can more clearly image a state of the analysis target person. A camera angle of the camera may be controlled such that the analysis target person or a specific part of the analysis target person falls within the imaging range.

Another example of the detailed information may be personal information of the analysis target person for the accident. The analysis unit 102 may specify the analysis target person from registrants on the basis of an authentication result of face authentication using a face image of the analysis target person appearing in the video that has imaged the occurrence of the accident and face information of the registrants, and derive personal information associated with a registrant as the detailed information. The personal information includes, but is not limited to, at least one of anamnesis, a clinical history, pregnancy status, an age, sex, a blood type, allergy information, a personal number, a primary medical institution, or an emergency contact.

In the above process, the analysis unit 102 may execute face authentication using the face image of the analysis target person and the face information of the registrant. Alternatively, the analysis unit 102 may specify the analysis target person from the registrants by acquiring an authentication result of face authentication executed by another device other than the notification device 10. Here, the personal information stored in another device may be acquired by the analysis unit 102 together with the authentication result, or the personal information may be acquired by the analysis unit 102 specifying the personal information from among pieces of personal information stored in a storage unit of the notification device 10 on the basis of the authentication result. Note that using a face for authentication is an example, and other biometric authentication techniques may be used. For example, the analysis unit 102 may perform authentication by using an iris that is a kind of physical characteristics, may perform authentication by using a gait that is a kind of behavioral characteristics, or may perform authentication by freely combining two or more biometric authentication technologies.

The determination unit 103 determines a coping method for coping with the analysis target person appearing in the video on the basis of the detailed information derived by the analysis unit 102. The coping method includes at least one of first aid, a procedure, or other actions for injury or disease of the analysis target person. In the present disclosure, the "first aid" refers to a concept including lifesaving and first aid for an analysis target person that can be performed by ordinary people, and the "procedure" refers to a medical procedure for an analysis target person that can be performed by a specialist such as a doctor or an emergency worker. The "first aid" and the "procedure" for a specific injury or disease may be completely different responses, or at least a part of the contents of both may overlap. The "other actions" include, but are not limited to, at least one of a request for an ambulance, a request for dispatch of a staff member to a place (accident site) where an accident has occurred, a request for acceptance of an analysis target person, preparation for a procedure, or contacting a predetermined contact address. Here, the "preparation for a procedure" includes, for example, at least one of preparation for blood transfusion, preparation for necessary medical equipment, or securing of medical staff member and a procedure place (for example, a place such as a hospital room, an operating room, or an examination room), but is not limited thereto. The "predetermined contact address" includes, for example, but is not limited to, at least one contact address of a relative such as a family member, a friend, a workplace, or a relation thereof, a specific medical institution or a care institution, a medical staff member, or a care staff member. The determination unit 103 may determine a coping method considered to be appropriate on the basis of the detailed information of the analysis target person obtained by the analysis unit 102.

In a case where the analysis unit 102 acquires the personal information described above as the detailed information, the determination unit 103 may determine a coping method for coping with the analysis target person on the basis of the personal information. For example, the determination unit 103 may determine at least one of first aid, a procedure, or other actions as the coping method on the basis of at least one of anamnesis, a clinical history, pregnancy status, an age, sex, a blood type, or allergy information of the analysis target person.

For example, in a case where the analysis unit 102 analyzes that there is an abnormality in a pulse state of the analysis target person and acquires the analysis result as the detailed information, and acquires "heart disease" as the personal information of the person as the clinical history, the determination unit 103 determines that a coping method for a heart attack is necessary for the analysis target person. It is determined to make a request for an ambulance, make a request for acceptance of the analysis target person by a medical institution (in particular, a medical institution specialized in the heart), and designate an automated external defibrillator (AED) for use in heart disease as a medical device to be used for first aid or a procedure. The determination unit 103 may determine a coping method in consideration of information regarding a position where the accident has occurred. For example, the determination unit 103 may compare information regarding a position where the accident has occurred with information regarding a position of a place where the AED is disposed, specify a location of the AED around the accident site, and include the specified location as a coping method. As another example, the determination unit 103 may determine to contact a predetermined contact address such as a primary medical institution or an emergency contact address as a coping method.

There is one or a plurality of notification targets as will be described later, and a coping method includes at least one content for each notification destination. A coping method for each notification destination may include any one of first aid, a procedure, and other actions, or may include a plurality of them. The coping method determined by the determination unit 103 may have the same content regardless of a notification destination, or may have different content depending on an attribute of a notification destination or the like. This will be described in detail in a second example embodiment.

The notification unit 104 notifies one or a plurality of notification targets of the coping method determined by the determination unit 103. The notification target may be a notification destination stored in advance in the notification device 10. The notification destination stored in advance is, for example, a public or private emergency service or a health facility, but is not limited thereto. The notification unit 104 may notify the same notification destination of each analysis target person, or may select a notification target from among a plurality of registered destinations on the basis of at least one of the detailed information derived by the analysis unit 102 or the coping method determined by the determination unit 103. For example, in a case where the determination unit 103 determines that a method for coping with a heart attack is necessary for the analysis target person, the notification unit 104 may set at least one of an emergency service or a medical institution (in particular, a medical institution specialized in the heart) as a notification destination stored in advance as a notification target. In a case where the analysis target person is a registrant registered in advance, the notification unit 104 may determine a notification target on the basis of personal information associated with the registrant. For example, the notification unit 104 may set a primary medical institution and an emergency contact included in the personal information as notification targets. The notification unit 104 may determine such a notification target instead of or in addition to the notification destination stored in advance.

The notification unit 104 may notify a notification target present in a surrounding region (first region) including the accident site of the coping method. The notification target present in the first region may be, for example, a medical person, a non-medical person, or a medical institution. This will be described later in detail in the second example embodiment.

The notification unit 104 may provide a notification of position information of the accident site specified by the accident occurrence detection unit 101 (that is, the position information where the analysis target person is present) together with the coping method. The notification executed by the notification unit 104 can take any form. For example, the notification unit 104 may provide a notification to an application of a terminal of the notification target, or may provide a notification by a message such as short message service (SMS) or multimedia messaging service (MMS), e-mail, telephone, or the like.

Note that at least one of the accident occurrence detection unit 101, the analysis unit 102, or the determination unit 103 may detect the occurrence of an accident, derive detailed information (for example, information regarding a body condition of the analysis target person), and determine a coping method by using an accident detection model subjected to machine learning.

For example, the accident occurrence detection unit 101 may detect the presence or absence of the occurrence of an accident by using an accident detection model subjected to machine learning such that a video is input as input data and a determination result of the presence or absence of an accident is generated as output data, and inputting videos captured by one or a plurality of cameras to the detection model. The analysis unit 102 may derive the detailed information by using a detailed information analysis model subjected to machine learning such that a video is input as input data and detailed information is generated as output data, and inputting videos captured by one or a plurality of cameras to the analysis model. The determination unit 103 may derive a coping method by using a coping method model subjected to machine learning such that detailed information is input as input data and a coping method is generated as output data and inputting detailed information derived by the analysis unit 102 to the model. The detection model described above may be provided inside or outside the notification device 10. An individual model may be provided in accordance with each process of the accident occurrence detection unit 101, the analysis unit 102, and the determination unit 103, or one model may be used in a plurality of processes (for example, processes of the accident occurrence detection unit 101 and the analysis unit 102). However, the accident occurrence detection unit 101, the analysis unit 102, and the determination unit 103 may execute each process according to other methods. For example, a table in which detailed information is associated with a coping method may be prepared, and after detailed information is derived by the analysis unit 102, the determination unit 103 may refer to the table to determine a coping method suitable for the detailed information.

Figure 2:
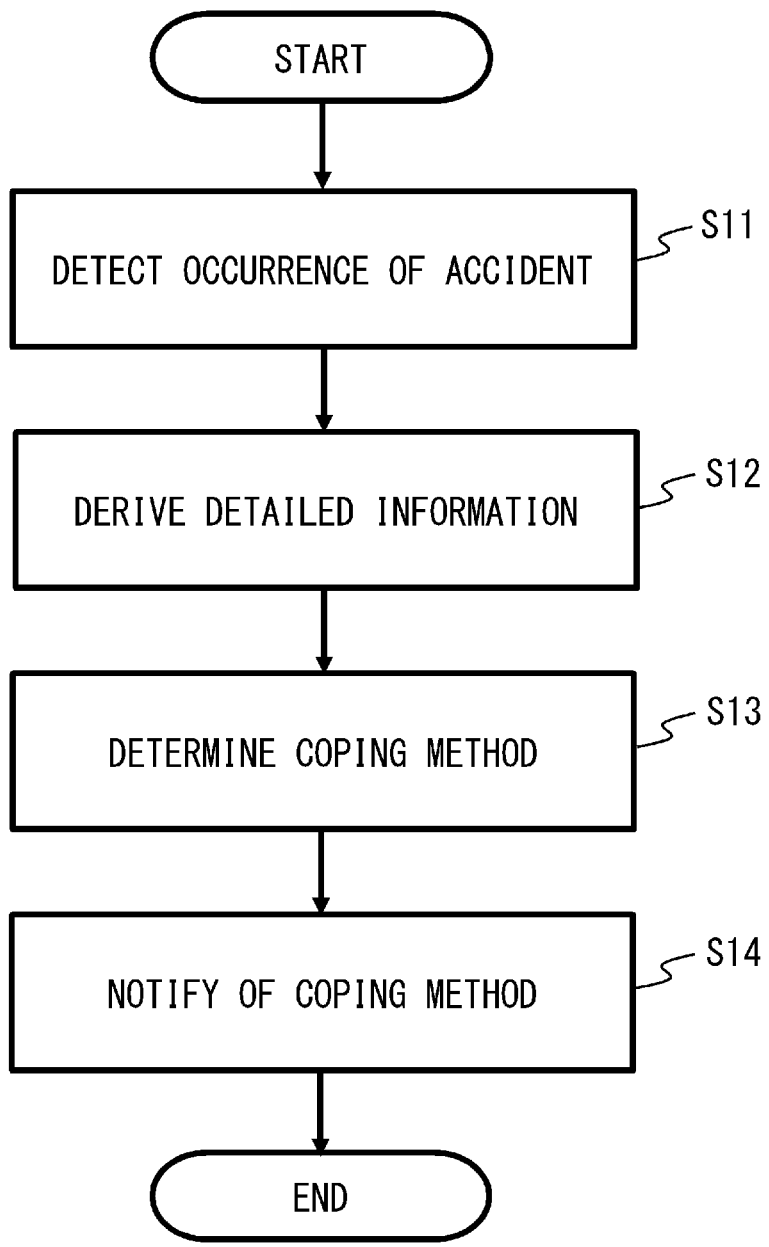
FIG. 2 is a flowchart illustrating an example of a process executed by the notification device according to the first example embodiment.

FIG. 2 is a flowchart illustrating an example of representative processing of the notification device 10, and processing of the notification device 10 will be described with this flowchart. The details of processing executed by each unit below are as described above. First, the accident occurrence detection unit 101 detects the occurrence of an accident from videos captured by one or a plurality of cameras (step S11; accident occurrence detection step). The analysis unit 102 analyzes the videos and derives detailed information of an analysis target person involved with the accident detected by the accident occurrence detection unit 101 (step S12; analysis step).

The determination unit 13 determines a coping method for coping with the analysis target person on the basis of the detailed information derived by the analysis unit 102 (step S13; determination step). The notification unit 104 notifies a notification target of the coping method determined in step S12 (step S14; notification step). The notification device 10 can operate as described above.

As described above, in a case where an accident occurs, the notification device 10 can analyze an analysis target person, determine a coping method, and perform a notification, and thus it is possible to realize a quick initial response with respect to the analysis target person.

Note that the notification device 10 may have a centralized configuration including a single computer or a distributed configuration in which a plurality of computers share and execute the processes of the accident occurrence detection unit 101 to the notification unit 104. In the distributed configuration, the plurality of devices may be connected via a communication network such as a local area network (LAN), a wide area network (WAN), or the Internet. This example will be described later in the second example embodiment.

(1B)

Next, in (1B), a notification system including the notification device 10 will be described.

Figure 3:
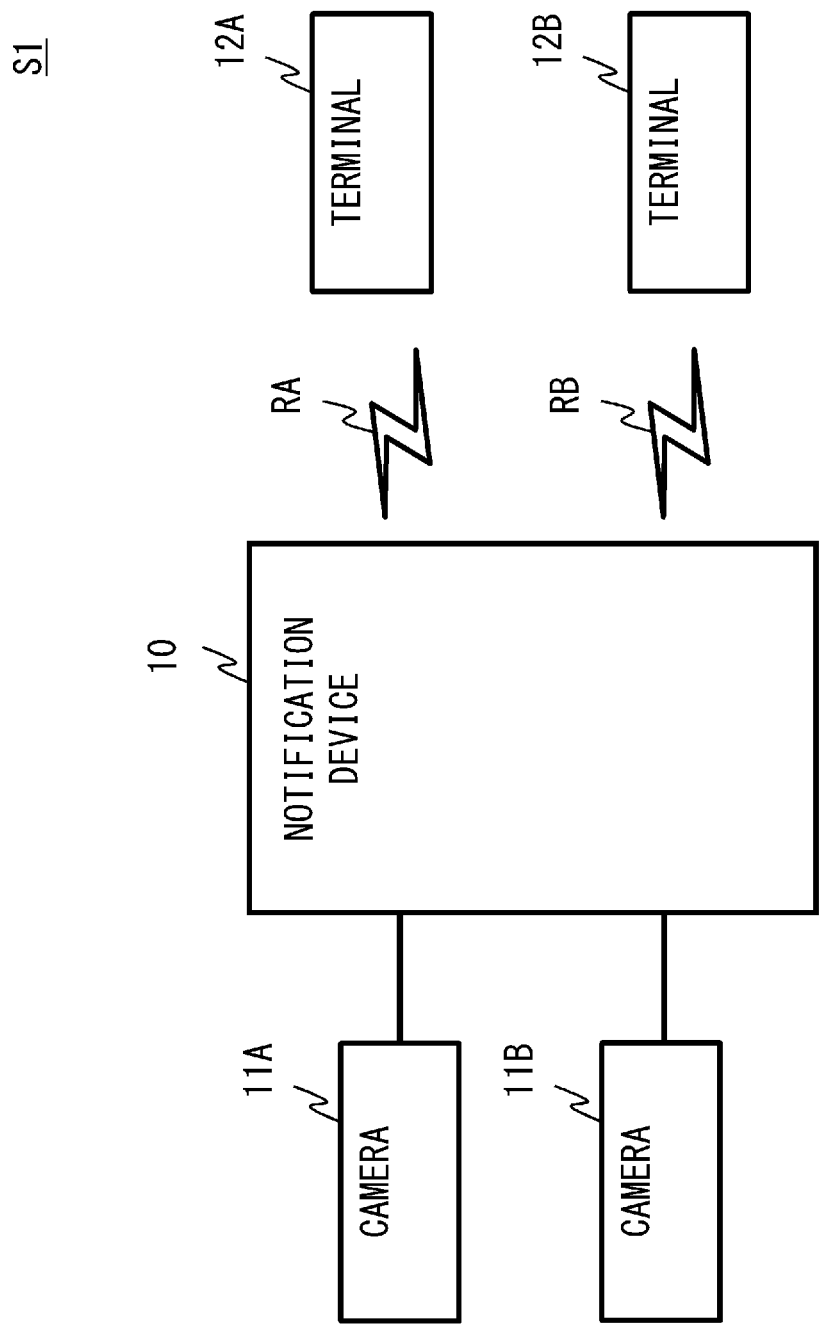
FIG. 3 is a schematic diagram illustrating an example of a notification system according to the first example embodiment.

FIG. 3 is a block diagram illustrating an example of a notification system. A notification system S1 includes the notification device 10, cameras 11A and 11 B, and terminals 12A and 12B. Since a description of the notification device 10 is the same as described in (1A), the description thereof will be omitted.

The cameras 11A and 11 B (hereinafter, collectively referred to as a camera 11) image any place and transmit imaged video data to the notification device 10. In FIG. 3, the camera 11 transmits video data via a wired line, but may transmit video data via a wireless line. The camera 11 and the notification device 10 may be directly connected, or may be connected via a communication network or the like. The accident occurrence detection unit 101 detects the occurrence of an accident from a video captured by the camera 11. Details thereof are as described in (1A). The analysis unit 102, the determination unit 103, and the notification unit 104 also execute the processes described in (1A). Note that output destinations of the notification from the notification unit 104 are the terminals 12A and 12B.

The terminals 12A and 12B (hereinafter, collectively referred to as a terminal 12) receive a coping method from the notification unit 104 of the notification device 10. In FIG. 3, the coping method is received via wireless lines RA and RB, but the coping method may be transmitted via a wired line. The terminal 12 may be any communicable information terminal such as a mobile phone such as a smartphone, a personal computer, a personal digital assistant, a car navigation, or an in-vehicle communication terminal.

Note that, although two cameras 11 and two terminals 12 are provided in (1B), three or more cameras and terminals may be provided and only one camera and terminal may be provided.

As an example, the camera 11 is provided at least at any of a traffic light, a roadside machine, an intersection, or a crossing, and can image the place. Note that the traffic light may be provided for any of a vehicle such as an automobile, a two-wheeled vehicle, and a bicycle, a pedestrian, and a railway. The intersection is a place where two or more roads intersect. The "road" may be an automobile road, or may be a bicycle or pedestrian road. Since these locations are places where an accident related to an automobile, a railway, or the like is assumed to occur, even in a case where there is an accident, the camera 11 images the accident and transmits video data to the notification device 10, so that the notification device 10 can provide a notification of a coping method for coping with an injured person in the accident. Therefore, it is possible to realize quick coping with respect to the injured person in the accident.

However, the camera 11 may be provided in any other outdoor place (for example, a place along a road or a railroad other than those described above, an airport, and a place in the vicinity thereof) or any indoor place. As described above, by providing the camera 11 in a place where an accident is likely to occur or in a place where there may be some other risk, it is possible to realize quick coping with respect to an accident injury person.

Second Example Embodiment (2A)

Hereinafter, the second example embodiment of the present disclosure will be described with reference to the drawings. In (2A), a specific example of the above-described first example embodiment (1B) will be described.

Figure 4:
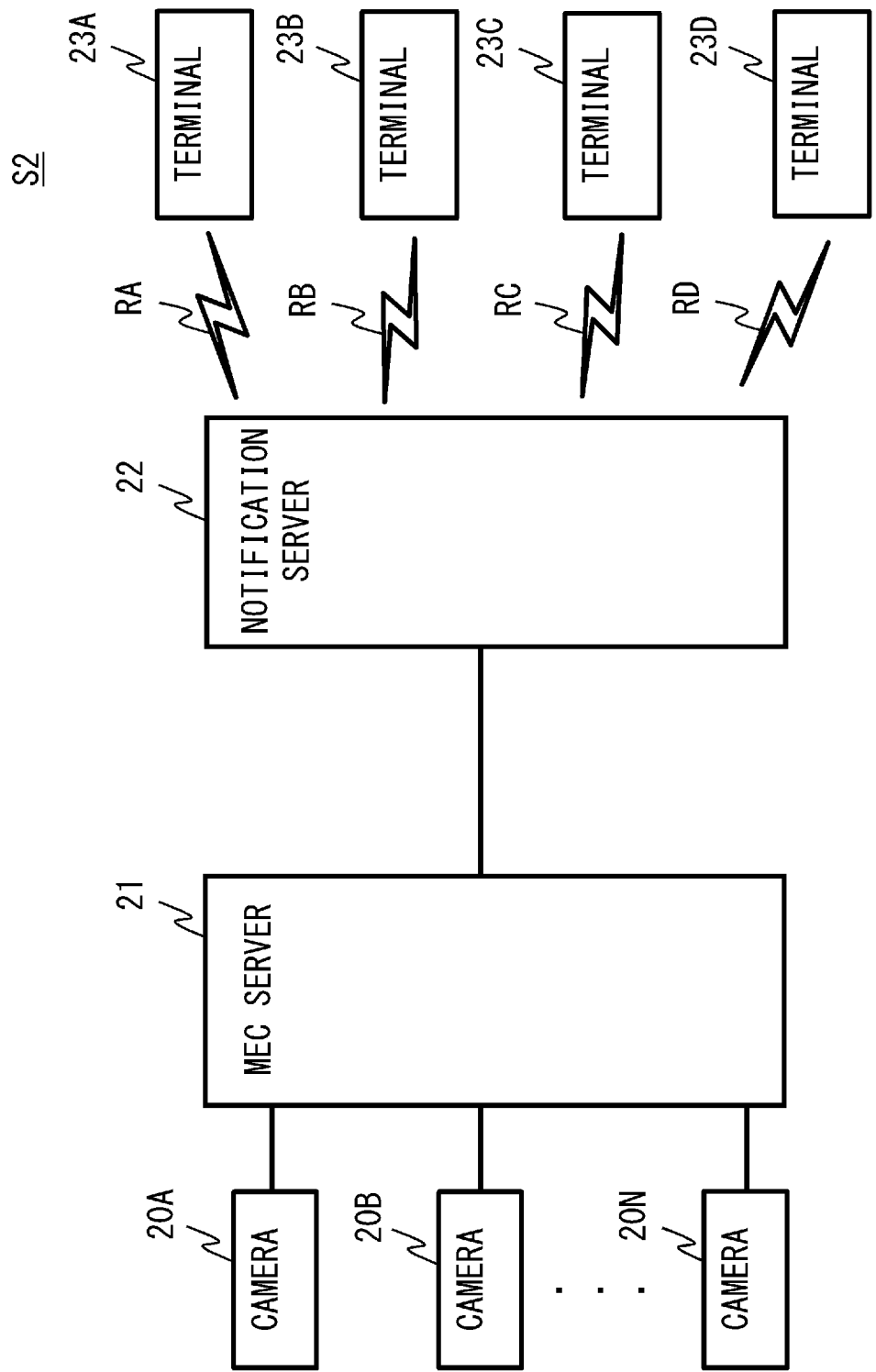
FIG. 4 is a schematic diagram illustrating an example of a notification system according to a second example embodiment.

FIG. 4 is a schematic diagram illustrating an example of a notification system. A notification system S2 includes cameras 20A to 20N, a Mobile Edge Computing or Multi-access Edge Computing (MEC) server 21, a notification server 22, and terminals 23A to 23D. Note that the cameras 20A to 20N and the terminals 23A to 23D will be collectively referred to as a camera 20 and a terminal 23, respectively. The camera 20 and the MEC server 21 may be connected via a wired line, may be connected via a wireless line such as Long Term Evolution (LTE), 5th Generation (5G), or a wireless LAN, or may be connected via a combination of a wired line and a wireless line. Similarly, the MEC server 21 and the notification server 22 may be connected via a wired line, may be connected via a wireless line such as LTE, 5G, or a wireless LAN, or may be connected via a combination of a wired line and a wireless line. The MEC server 21 and the notification server 22 have a configuration in which a plurality of computers share and execute processes of the accident occurrence detection unit 101 to the notification unit 104. Although the notification server 22 and the terminal 23 receive a notification via wireless lines RA to RD such as LTE, 5G, or a wireless LAN, an example of reception mode is not limited thereto, and the notification may be received via a wired line or may be received via both a wired line and a wireless line. Each unit of each device is controlled by a control unit (controller) in a device (not illustrated) reading a program. Hereinafter, a configuration and a process of each device will be described.

Figure 5:
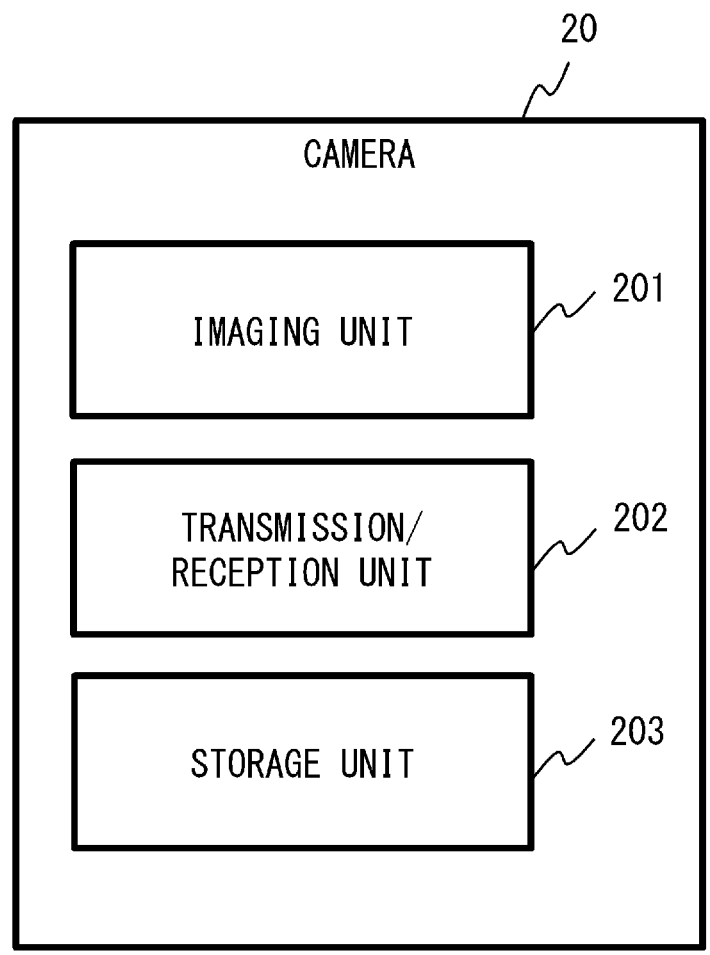
FIG. 5 is a block diagram illustrating an example of a camera according to a second example embodiment.

FIG. 5 is a block diagram illustrating an example of the camera 20. The camera 20 corresponds to the camera 11 in (1B), and includes an imaging unit 201, a transmission/reception unit (transceiver) 202, and a storage unit 203. Each constituent of the camera 20 will be described below.

The imaging unit 201 includes a lens, an imaging element, and the like as a hard configuration, and images a video. However, images captured and transmitted by the camera 20 may be still images captured at predetermined intervals. The imaging unit 201 may have a function of controlling one or more of an imaging magnification, a resolution, a frame rate, a quantization bit rate, a bit rate, and a camera angle. The video data may also include time information at the time of imaging. The transmission/reception unit 202 transmits the video data to the MEC server 21 together with identification information (for example, information such as ID of the own camera and position information) of the camera 20. The ID of the own camera may be any character string or number string assigned to each camera without duplication, or may be communication address information such as an Internet protocol (IP) address. The storage unit 203 stores identification information to be transmitted by the transmission/reception unit 202. Note that this identification information may be changed as appropriate according to movement of the camera 20 or the like.

Figure 6:
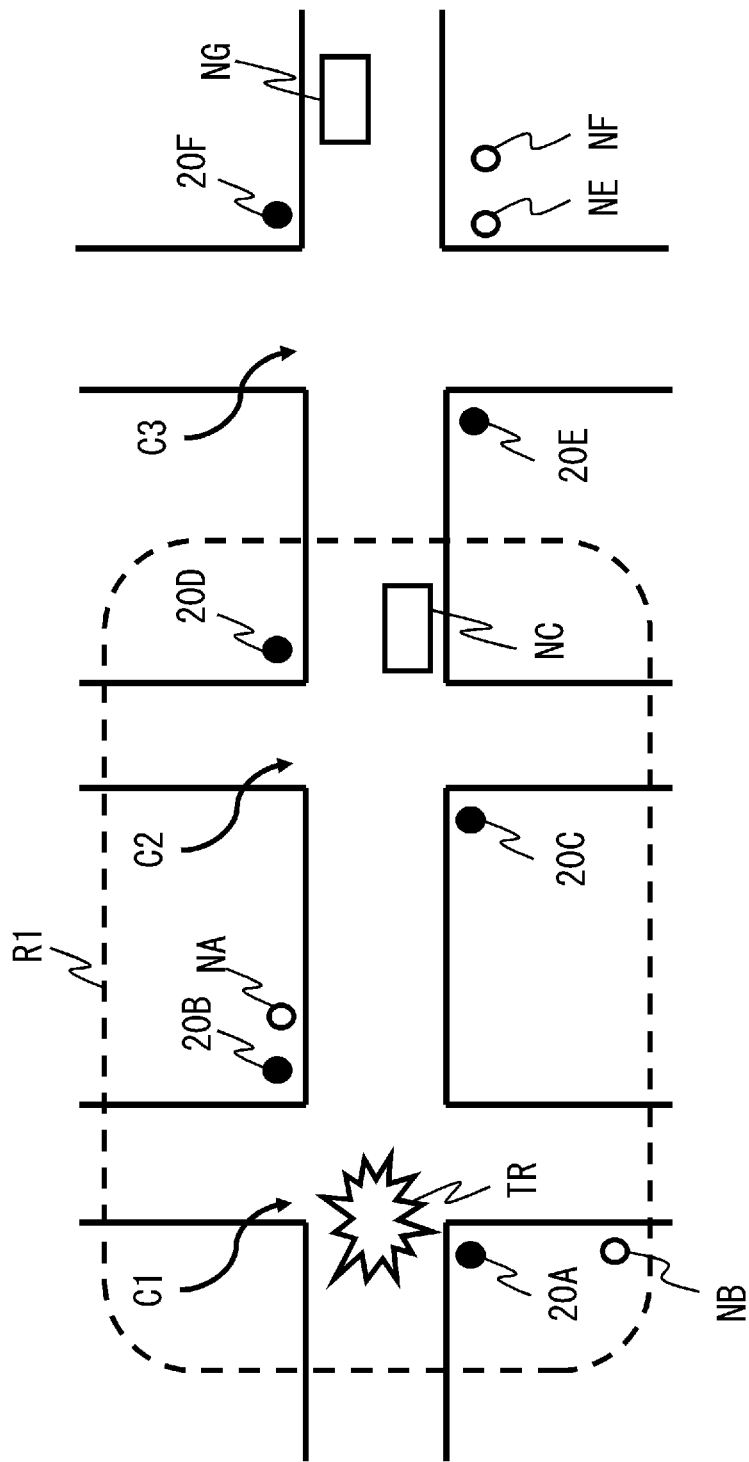
FIG. 6 is a schematic diagram illustrating an example of a road on which the camera according to the second example embodiment is provided.

FIG. 6 is a schematic diagram illustrating an example of a road on which the camera 20 is provided. In this example, the cameras 20A and 20 B are provided at a traffic light at an intersection C1, the cameras 20C and 20D are provided at a traffic light at an intersection C2, and the cameras 20E and 20F are provided at a traffic light at an intersection C3. For example, the cameras 20A and 20B are provided at traffic lights at different positions at the same intersection C1. Thus, the cameras 20A and 20B transmit video data obtained by imaging the intersection C1 from different positions and angles to the MEC server 21. Specifically, the camera 20A includes the intersection C1 and the periphery of the camera 20B in its imaging range, and the camera 20B includes the intersection C1 and the periphery of the camera 20A in its imaging range. For a similar reason, the cameras 20C and 20D transmit video data obtained by imaging the intersection C2 from different positions and angles to the MEC server 21, and the cameras 20E and 20F transmit video data obtained by imaging the intersection C3 from different positions and angles to the MEC server 21. Since the intersection C2 is adjacent to the intersection C1, the intersection C2 is included in a region R1 that will be described later including the intersection C1.

In the example in FIG. 6, an accident TR occurs at the intersection C1. Therefore, the cameras 20A and 20B transmit video data obtained by imaging the accident TR to the MEC server 21. The camera 20A captures an image of a medical person NA when the accident occurs, and the camera 20B captures an image of a non-medical person NB when the accident occurs. At the time of occurrence of the accident, the cameras 20C and 20D image a vehicle NC that is an automobile owned by a hospital C. There are a medical person NE, a non-medical person NF, and a vehicle NG that is an automobile owned by a non-medical person G around the intersection C3. At the time of the occurrence of the accident, the cameras 20E and 20F image the medical person NE and the non-medical person NF, and the camera 20E images the vehicle NG.

Figure 7:
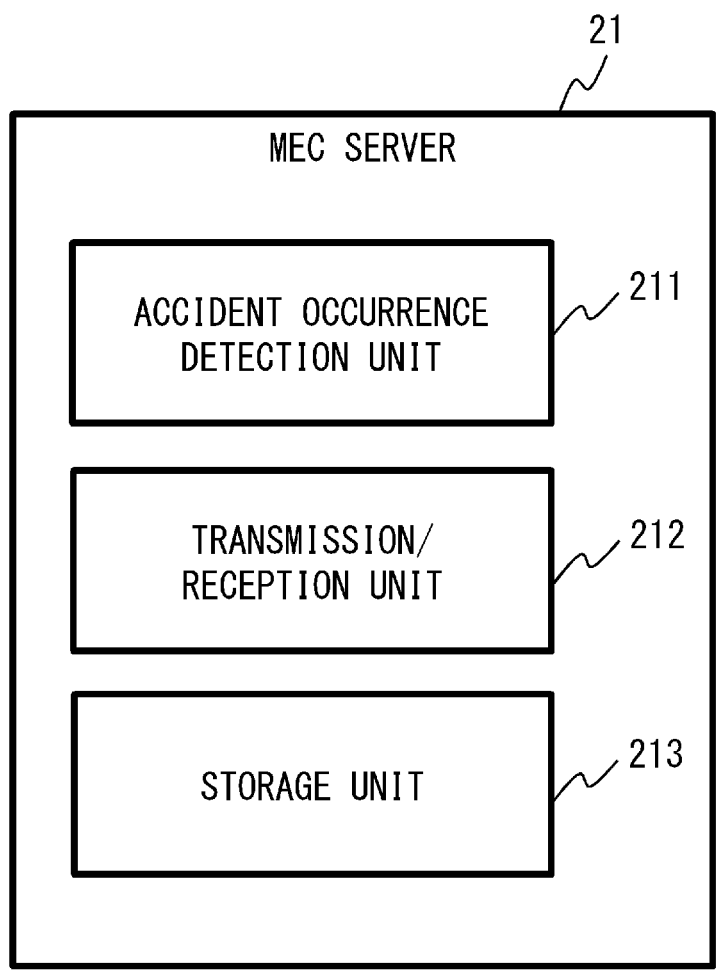
FIG. 7 is a block diagram illustrating an example of a MEC server according to the second example embodiment.

FIG. 7 is a block diagram illustrating an example of the MEC server 21. The MEC server 21 corresponds to a part of the notification device 10 in (1B), and includes an accident occurrence detection unit 211, a transmission/reception unit (transceiver) 212, and a storage unit 213 in this example. Each constituent of the MEC server 21 will be described below.

The accident occurrence detection unit 211 corresponds to the accident occurrence detection unit 101 in (1A), and detects the occurrence of an accident from video data transmitted from each of the cameras 20A to 20N. The accident occurrence detection unit 211 analyzes the videos captured by the cameras 20A to 20N to detect that an accident has occurred at a certain time point t in imaging regions of the cameras 20A and 20B, that is, the intersection C1. Here, the accident occurrence detection unit 211 specifies a position of the accident site on the basis of positions of the cameras 20A and 20B determined to have imaged the occurrence of the accident and a range in which the accident has occurred in the video data. The accident occurrence detection unit 211 may specify the positions of the cameras 20A and 20B by referring to position information of the cameras 20A and 20B stored in the storage unit 213 that will be described later on the basis of IDs of the cameras transmitted by the cameras 20A and 20B. In a case where the cameras 20A and 20B transmit the position information of the cameras, the accident occurrence detection unit 211 may use the position information without any change.

The accident occurrence detection unit 211 uses an accident detection model subjected to machine learning such that a video is input as input data and a determination result of the presence or absence of an accident is generated as output data, and inputs video data captured by each of the cameras 20A to 20N to the detection model. As a result, the accident occurrence detection unit 211 detects whether an accident has occurred in each piece of video data. Since the other processes executed by the accident occurrence detection unit 211 are similar to those of the accident occurrence detection unit 101, descriptions thereof will be omitted.

The transmission/reception unit 212 receives captured video data and identification information from each of the cameras 20A to 20N. In a case where an accident is detected in video data of a certain camera 20, the accident occurrence detection unit 211 extracts video data captured by the camera 20 from time point t1 around time point t at which the accident is detected to the present time (at the time of execution of this process of the accident occurrence detection unit 211). The transmission/reception unit 212 transmits both of the extracted video data and the position information of the accident site to the notification server 22. In this example, the transmission/reception unit 212 transmits both of the video data captured by the cameras 20A and 20B from time point t1 at which the accident is detected to the present time and the position information of the intersection C to the notification server 22. Note that identification information of the camera 20 that has captured the accident may be transmitted as the position information of the accident site.

The accident occurrence detection unit 211 determines a region R1 (refer to FIG. 6) including the intersection C that is an accident site as a first region including the accident site. The accident occurrence detection unit 211 specifies the camera 20 that captures the region R1 on the basis of the information of the capturing place of the camera 20 stored in the storage unit 213. As illustrated in FIG. 6, the cameras 20 that image the region R1 are the cameras 20A and 20B provided at the intersection C1 and the cameras 20C and 20D provided near the intersection C1. Therefore, the accident occurrence detection unit 211 determines that not only video data captured by the cameras 20A and 20B but also video data captured by the cameras 20C and 20D are necessary to detect a notification target that will be described later in the notification server 22. The accident occurrence detection unit 211 also extracts video data of the cameras 20C and 20D from time point t2 to the present, and the transmission/reception unit 212 transmits the video data to the notification server 22. However, since the periphery of the intersection C3 is not in the region R1, the video data captured by the cameras 20E and 20F is not transmitted to the notification server 22. Therefore, in this case, the medical person NE, the non-medical person NF, and the vehicle NG are not considered as notification targets.

Any range may be set for the "first region". For example, the "first region" may be a circular region having a radius of a predetermined distance from the accident site, a region located within a predetermined time at a predetermined walking speed or vehicle speed from the accident site, or a predetermined section including the accident site. Examples of the predetermined section include, but are not limited to, an emergency service section and an administrative section such as a prefecture, a city, a town, a village, a ward, or a state. The accident occurrence detection unit 211 can set the first region as described above by using, for example, position information of the detected accident site, map information of the periphery of the accident site stored in the storage unit 213, and criteria for setting the first region.

Time points t1 and t2 may be the same timing as time point t, or may be a timing a predetermined period before time point t such that the details of the accident can be reliably clarified in the notification server 22. The predetermined period is, for example, about several seconds to several minutes. Alternatively, a predetermined criterion for determining time points t1 and t2 may be defined. For example, it is conceivable to set time point t1 as a timing at which an injured person in the accident appears in the video data for the first time. The accident occurrence detection unit 211 determines time points t1 and t2 by using a predetermined period or a reference of the timing stored in the storage unit 213, and extracts the video data as described above.

The storage unit 213 stores information necessary for processes executed by the accident occurrence detection unit 211 and the transmission/reception unit 212. Specifically, the following information may be stored:

(i) A detection model used by the accident occurrence detection unit 211, map information, and criteria for setting the first region (ii) Position information of each camera 20 associated with ID of the camera 20

(iii) Video data captured by the cameras 20A to 20N during a predetermined period, which is a detection target of the accident occurrence detection unit 211

Figure 8:
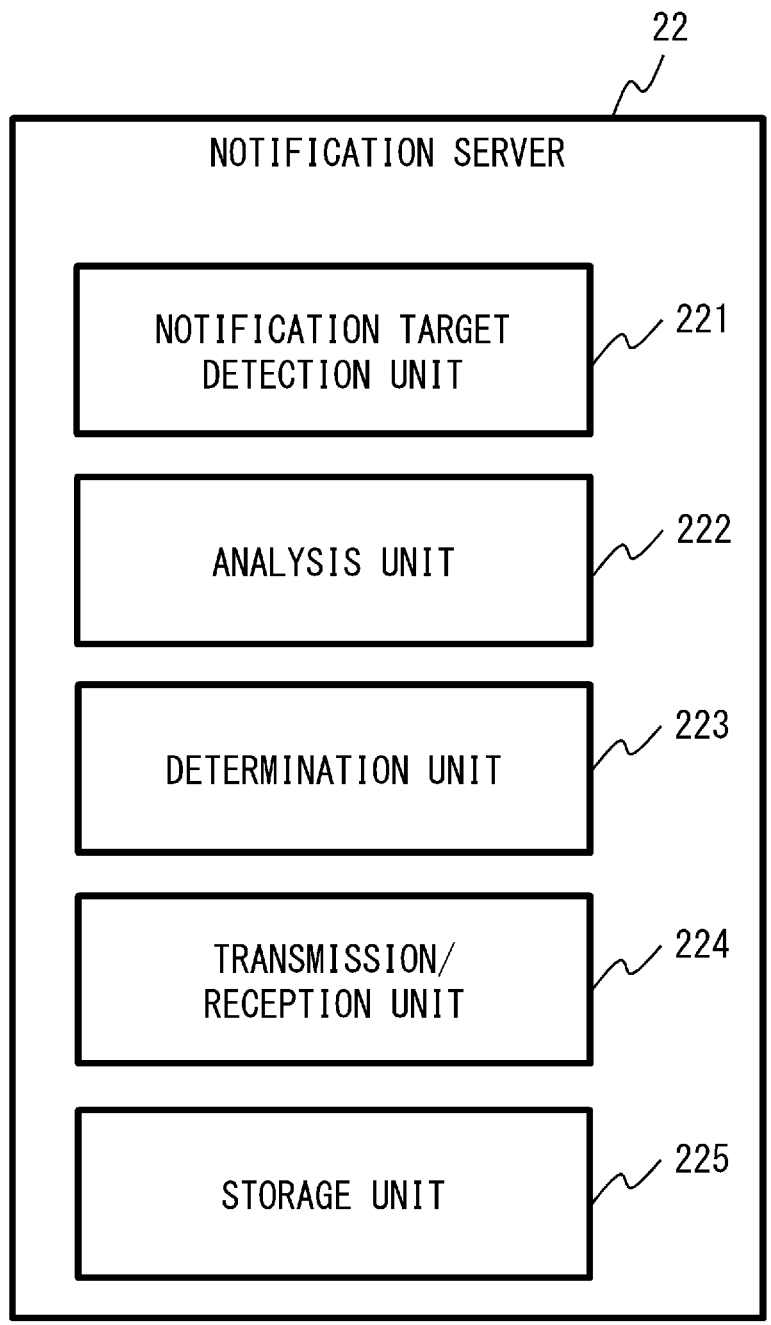
FIG. 8 is a block diagram illustrating an example of a notification server according to the second example embodiment.

(iv) Values of the timings t1 and t2 for extracting video data, or criteria for setting the timings FIG. 8 is a block diagram illustrating an example of the notification server 22. The notification server 22 corresponds to a part of the notification device 10 in (1B), and includes a notification target detection unit 221, an analysis unit 222, a determination unit 223, a transmission/reception unit (transceiver) 224, and a storage unit 225. Hereinafter, each constituent of the notification server 22 will be described.

The notification target detection unit 221 detects a notification target present in a first region (detection region) including an accident site. Here, the notification target includes at least one of a predetermined organization, an individual, or a vehicle. The predetermined organization that is a notification target candidate is, for example, an organization related to medical care or emergency, and this includes a medical institution such as a hospital or a clinic, and an organization related to emergency that dispatches a specialized staff such as an emergency worker, regardless of whether it is public or private. The organization related to emergency is, for example, an organization such as a fire department or emergency medical services (EMS), but is not limited thereto. A police station in charge of accident processing or a company (for example, a road service company) in response to an accident such as a road or a railway may be included as the predetermined organization that is a notification target candidate.

The predetermined individual who is a notification target candidate may include at least one of a medical person such as a doctor, a nurse, or an emergency paramedic, or a non-medical person (particularly, an ordinary person). A person whose job is to go to an accident site, such as a firefighter, a police officer, and a staff member of a company coping with an accident, may be included. The predetermined vehicle that is a notification target candidate is, for example, a vehicle possessed (owned or temporarily occupied) by the predetermined organization or individual described above. Examples thereof include an ambulance and an automobile owned by a hospital.

Note that information indicating each organization, each individual, and each vehicle that are notification target candidates is stored in the storage unit 225 in advance together with terminal information of each organization, each individual, and each vehicle that are actual transmission destinations of the notification of the transmission/reception unit 224. The terminal is a terminal (for example, a terminal owned or temporarily occupied by an organization or the like) associated with each organization, each individual, or each vehicle, and the terminal information may be updated as appropriate by each organization, each individual, or an administrator.

However, the notification target detection unit 221 may select a predetermined organization, individual, and vehicle that are not present in the first region including the accident site as notification targets. In a case where the analysis unit 222 that will be described later acquires information such as a primary medical institution or an emergency contact as personal information, the notification target detection unit 221 may add the contact information as a notification target regardless of locations of the primary medical institution and the emergency contact.

For an emergency medical institution that is a type of predetermined organization, an emergency medical institution that is a notification target candidate may be stored in the storage unit 225. On the basis of at least one of the position information of the accident site received from the MEC server 21 or the detailed information acquired by the analysis unit 222, the notification target detection unit 221 may specify one or a plurality of emergency medical institutions according to the situation of the accident regardless of whether or not the emergency medical institution is present in the first region including the accident site and select the emergency medical institution as a notification target. The detailed information used to specify the emergency medical institution may be, for example, at least one of information regarding a body condition of an analysis target person acquired by the analysis unit 222 by analyzing the video data (for example, information regarding the type or degree of injury or illness) and personal information such as anamnesis, a clinical history, or pregnancy status. However, the notification target detection unit 221 may select, as notification targets, one or a plurality of predetermined organizations registered in advance as notification targets as emergency response organizations regardless of situations.

As a method in which the notification target detection unit 221 detects a notification target, various methods are assumed, but an example thereof is described in (2A). The notification target detection unit 221 analyzes the video data captured by each of the cameras 20A to 20D and received from the MEC server 21, and detects whether or not a notification target candidate appears in the video data.

Here, specifying information for specifying a predetermined individual or vehicle and detecting a notification target by the notification target detection unit 221 by using video data is stored in the storage unit 225. The specifying information is biometric information such as face information in a case of each individual, and is information that can specify a vehicle such as a number of a license plate or video data in a case of each vehicle. The notification target detection unit 221 compares the specifying information with the video data captured by cameras 20A to 20D to determine whether or not a notification target candidate appears in each piece of video data in the first region.

In this example, the notification target detection unit 221 determines that candidates, the medical person NA and the non-medical person NB who are notification target candidates, appear in the video data captured by each of the cameras 20A and 20B. The notification target detection unit 221 detects that the number plate of the vehicle NC, that is a notification target candidate, appears in the video data captured by the cameras 20C and 20D. As a result, the notification target detection unit 221 detects the medical person NA, the non-medical person NB, and the vehicle NC owned by the hospital C as notification targets present in the first region including the accident site. These notification targets are notified of a coping method.

The analysis unit 222 corresponds to the analysis unit 102 according to the first example embodiment, and derives detailed information of an analysis target person involved with an accident appearing in video data from the cameras 20A and 20B. Specifically, the analysis unit 222 specifies an analysis target person from registrants by executing face authentication using a face image of the analysis target person appearing in the video data and face information of the registrant stored in advance in the storage unit 225, and acquires personal information of the registrant stored in the storage unit 225 as the detailed information. The registrant is a person who has registered personal information by himself/herself in advance, a person having a chronic disease, or a person stored in advance as some important person. The analysis unit 222 also acquires information regarding a body condition of the analysis target person as detailed information by analyzing the video data from the cameras 20A and 20B. The analysis unit 222 can acquire at least one of the personal information or the information regarding the body condition as the detailed information. The details of the personal information, the information regarding the body condition of the analysis target person, and the details of other processes executed by the analysis unit 222 are the same as those described in the first example embodiment, and thus descriptions thereof will be omitted.

In this example, the analysis unit 222 acquires, as the personal information, information indicating that there is a cardiac disease in a clinical history of the analysis target person and a contact address of a hospital D that is a primary medical institution. As the body condition of the analysis target person, an abnormality in the respiratory state and the pulse state is acquired.

In response to the analysis unit 222 having acquired information regarding the contact address of the hospital D as the personal information, the notification target detection unit 221 adds the hospital D as a notification target. The hospital D need not to be present in the first region including the accident site.

The determination unit 223 corresponds to the determination unit 103 according to the first example embodiment, and determines a coping method for coping with the analysis target person. In this example, the determination unit 223 can determine coping methods separately for a case where notification targets are the medical person NA and the vehicle NC (a medical person or a vehicle thereof), a case where a notification target is the non-medical person NB (ordinary person), and a case where a notification target is the hospital D (medical institution).

In a case where notification targets are the medical person NA and the vehicle NC, the determination unit 223 determines a procedure for the analysis target person, and further specifies a place of the medical device that is used in the procedure and is present in a predetermined region (third region) including the accident site. In this example, the determination unit 223 determines, as the procedure for the analysis target person, artificial respiration, breastbone compression (heart massage), use of an AED, and a procedure that can be performed by a medical person. The determination unit 223 specifies an AED as a medical device used in the procedure, and refers to a list of position information where AEDs are provided stored in the storage unit 225 and position information of the accident site to specify a place of an AED present in a predetermined region including the accident site. The determination unit 223 causes information regarding the procedure and information regarding the place of the AED present in the predetermined region to be included in the coping method in which the medical person NA and the vehicle NC are the notification targets. Note that the predetermined region (third region) including the accident site where the medical device is present may be the same region as the first region or may be a different region. Criteria for setting this region are stored in the storage unit 225.

In a case where a notification target is the non-medical person NB, the determination unit 223 determines first aid for the analysis target person and specifies a place of a medical device that is used in the first aid and is present in a predetermined region including the accident site. In this example, the determination unit 223 determines artificial respiration, breastbone compression, and use of an AED as first aid for the analysis target person. As described above, the determination unit 223 specifies the place of the AED present in a predetermined region (third region) including the accident site. The determination unit 223 causes the information regarding the first aid and the information regarding the place of the AED present in the predetermined region to be included in the coping method.

However, the determination unit 223 may cause only one of two pieces of information, that is, the information regarding the procedure or the first aid and the information regarding the place of the AED present in the predetermined region, to be included in the coping method.

In a case where a notification target is the hospital D, the determination unit 223 determines a coping method to include the procedure for the analysis target person and the request for acceptance of the analysis target person. The procedure is the same as the procedure in a case where notification targets are the medical person NA and the vehicle NC. However, a coping method is not limited to this example, and the determination unit 223 may determine the coping method to include at least one of a procedure for the analysis target person, a request for dispatch of a staff to the accident site, or a request for acceptance of the analysis target person. Note that details of other processes executed by the determination unit 223 are as described in the first example embodiment, and thus descriptions thereof will be omitted.

The transmission/reception unit 224 corresponds to the notification unit 104 according to the first example embodiment, and notifies the notification target detected by the notification target detection unit 221 of the coping method determined by the determination unit 223. In this example, the transmission/reception unit 224 notifies the terminals 23A and 23C of a coping method including the information regarding the procedure and the information regarding the place of the AED present in the predetermined region. The transmission/reception unit 224 notifies the terminal 23B of a coping method including the information regarding the first aid and the information regarding the place of the AED present in the predetermined region. The transmission/reception unit 224 notifies the terminal 23D of the coping method including the procedure for the analysis target person and a request for acceptance of the analysis target person. Here, the terminals 23A and 23B are smartphones owned by the medical person NA and the non-medical person NB, respectively, the terminal 23C is a car navigation system mounted on the vehicle NC, and the terminal 23D is a terminal for receiving urgent cases, provided in the hospital D. Pieces of contact information of the terminals 23A, 23B, and 23C are stored in the storage unit 225 as information regarding notification target candidates in association with the medical person NA, the non-medical person NB, and the vehicle NC, respectively, and the transmission/reception unit 224 uses these pieces of information for transmission. The contact information of the terminal 23D is included in the personal information acquired by the analysis unit 222 as described above, and the transmission/reception unit 224 uses the information for transmission. Note that the "contact information" is information including at least any of communication address information (for example, an IP address), a telephone number, an e-mail address, any other user identifiers, or the like of each terminal.

The transmission/reception unit 224 transmits the coping method to the terminals 23A, 23B, and 23D via the wireless lines RA, RB, and RD, respectively. The transmission/reception unit 224 transmits the coping method to a roadside machine (not illustrated) near the terminal 23C, and the roadside machine transmits the coping method to the terminal 23C via the wireless line RC. As described above, the notification server 22 can transmit the coping method to the terminal mounted on the automobile via the roadside machine. In addition to the coping method, the transmission/reception unit 224 may notify each notification target terminal 23 of the position information (that is, the position information where the analysis target person is present) of the accident site received by the notification server 22.

Information necessary for processes executed by the notification target detection unit 221 to the transmission/reception unit 224 is stored in the storage unit 225. Specifically, the following information may be stored:

(i) Information regarding a predetermined organization, individual, and vehicle that are notification target candidates, and terminal information of the organization, the individual, and the vehicle that are transmission destinations of a notification associated with each piece of the information
(ii) Identification information for specifying a predetermined individual or vehicle for the notification target detection unit 221 detecting a notification target by using video data
(iii) Face information of a registrant for the analysis unit 222 to execute face authentication
(iv) A list of position information in which various medical devices (for example, AEDs) are provided, and criteria for setting a predetermined region (third region) serving as a notification range of a place where various medical devices are present However, the storage unit 225 may further store one or a plurality of predetermined organizations registered in advance as notification targets as emergency response organizations.

The storage unit 225 may also store map information of a place where the camera 20 managed by the notification server 22 is disposed and criteria for setting the first region. An administrator can update these pieces of information, and in a case where the information is updated, the notification server 22 transmits the updated information to the MEC server 21. As a result, the MEC server 21 updates the information stored in the storage unit 213.

Figure 9:
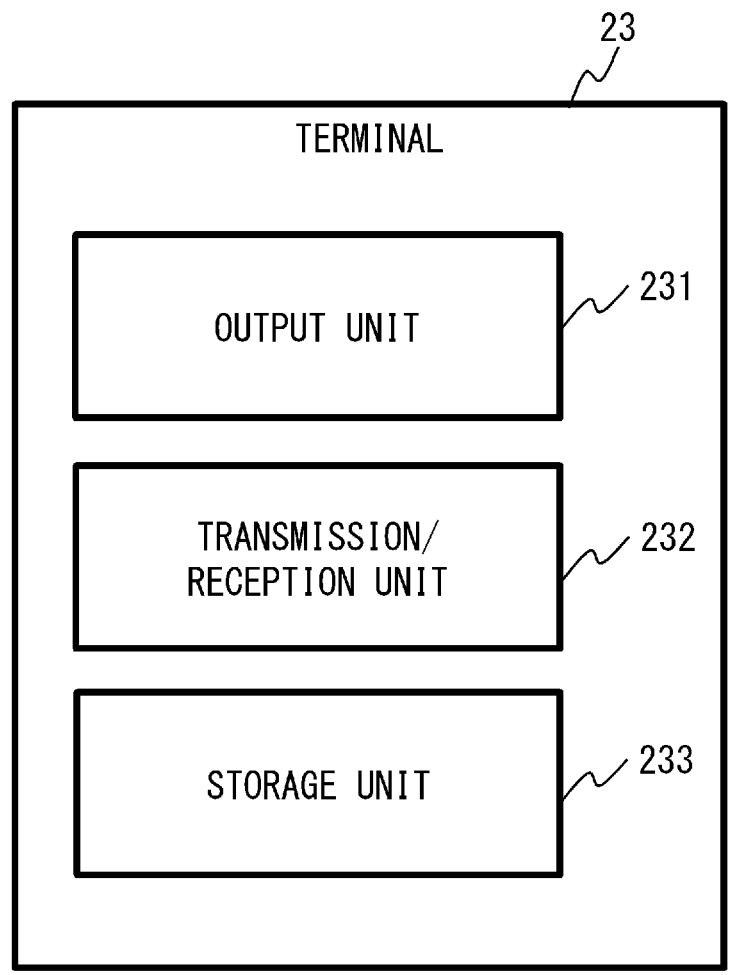
FIG. 9 is a block diagram illustrating an example of a terminal according to the second example embodiment.

FIG. 9 is a block diagram illustrating an example of the terminal 23. The terminal 23 corresponds to the terminal 12 in (1B), and includes an output unit 231, a transmission/reception unit (transceiver) 232, and a storage unit 233. Hereinafter, each constituent of the terminal 23 will be described.

The output unit 231 is an interface that notifies a user of the terminal 23 of information by text, image, voice, or the like, and includes a display, a speaker, or the like. The output unit 231 outputs, to the user of the terminal 23, the coping method and the position information of the accident site transmitted from the transmission/reception unit 224 of the notification server 22 to each terminal 23. For example, in a case where the terminal 23 is a smartphone, these pieces of information may be displayed on a display thereof, and in a case where the terminal 23 is a car navigation system, these pieces of information may be displayed on a display thereof.

The transmission/reception unit 232 receives the coping method and the position information of the accident site reported from the notification server 22. In a case where the terminal 23 further includes an input unit, and a user who has visually recognized the coping method inputs content indicating that the coping method has been confirmed, the transmission/reception unit 232 may transmit a notification indicating that the coping method has been confirmed to the notification server 22.

The storage unit 233 stores information such as the coping method transmitted from the notification server 22, and also stores information necessary for an operation of the terminal 23.

Figure 10:
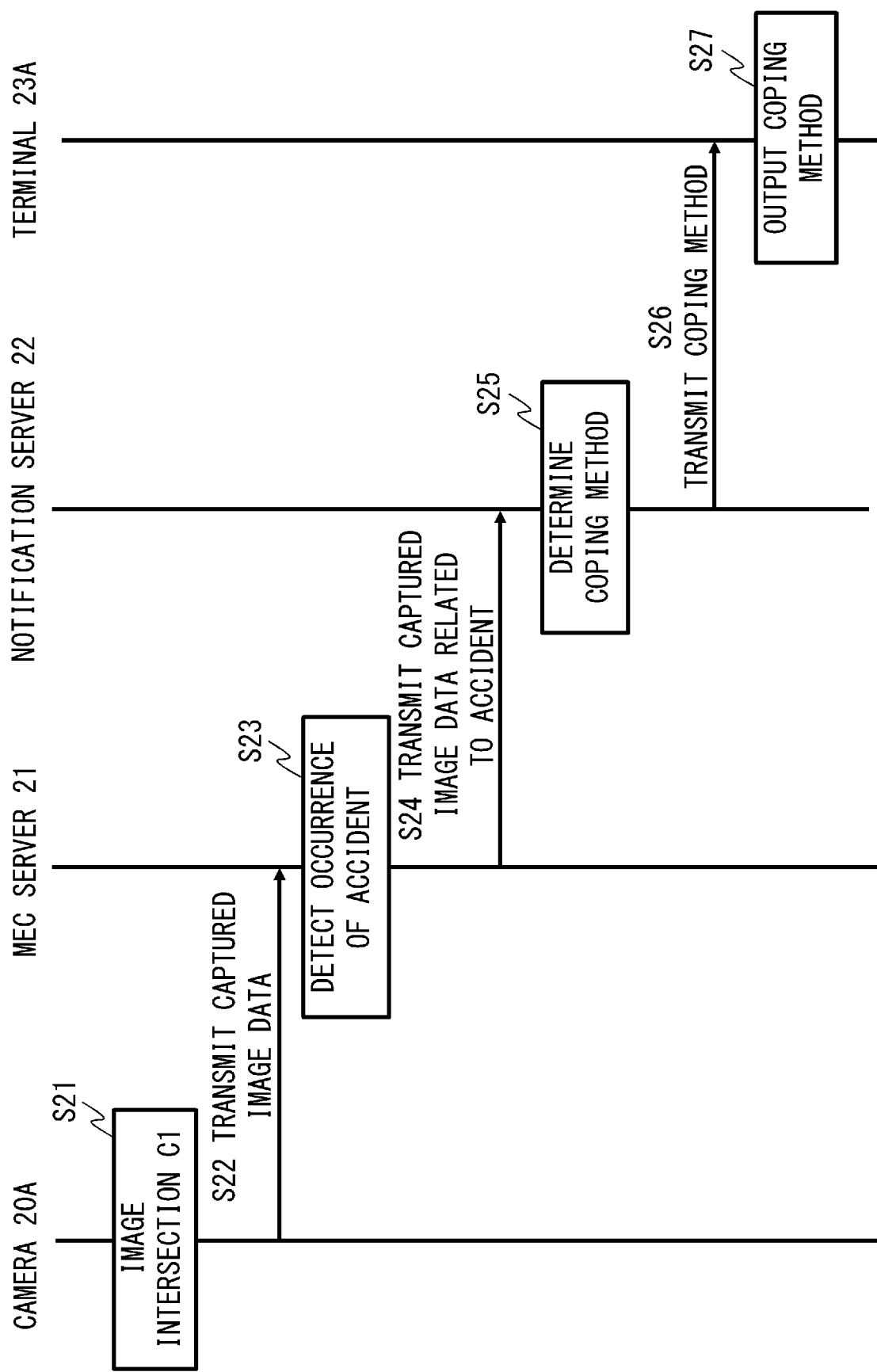
FIG. 10 is a sequence diagram illustrating an example of a representative process of the notification system according to the second example embodiment.

FIG. 10 is a sequence diagram illustrating an example of a representative process of the notification system S2, and a process of the notification system S2 will be described with this sequence diagram. The details of the process executed by each device below are as described above. Note that, in FIG. 10, the camera 20A and the terminal 23A are illustrated as examples of the camera 20 and the terminal 23, respectively, but the other cameras 20 and the terminal 23 also perform processes similar to the following processes.

First, the imaging unit 201 of the camera 20A images the intersection C1 (step S21), and the transmission/reception unit 202 transmits the captured video data to the MEC server 21 (step S22).

The transmission/reception unit 212 of the MEC server 21 receives the video data transmitted in step S22. The accident occurrence detection unit 211 detects the occurrence of the accident at the intersection C1 on the basis of the video data of the camera 20A (step S23). As described above, the transmission/reception unit 212 transmits the video data of the camera 20A related to the accident to the notification server 22 (step S24).

The transmission/reception unit 224 of the notification server 22 receives the video data transmitted in step S24. The notification server 22 determines a coping method related to the analysis target person on the basis of the received video data (step S25). This will be described later in detail. The transmission/reception unit 224 of the notification server 22 transmits the determined coping method and the like to the terminal 23 (step S26).

The transmission/reception unit 232 of the terminal 23A receives the video data transmitted in step S26. The output unit 231 of the terminal 23A outputs a coping method and the like to the user (step S27).

Figure 11:
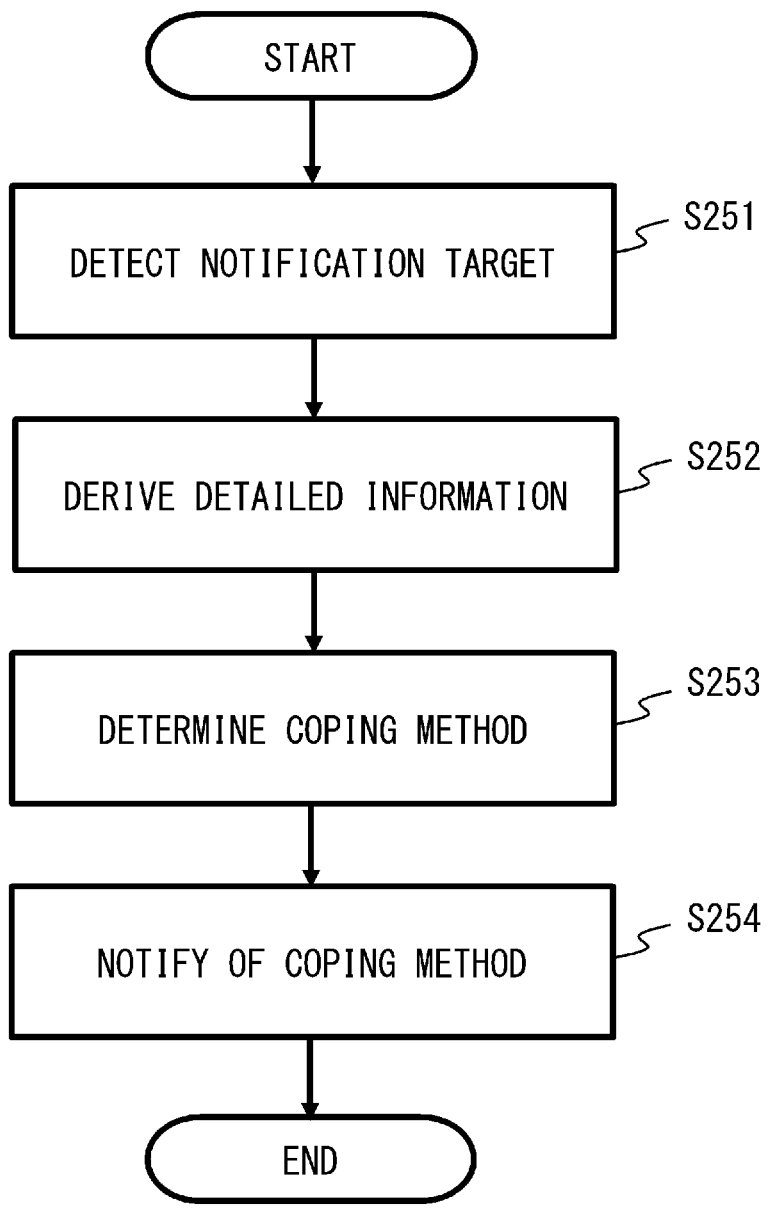
FIG. 11 is a flowchart illustrating an example of a process executed by the notification server according to the second example embodiment.

FIG. 11 is a flowchart illustrating an example of the process in step S25, and a process of the notification server 22 will be described with this flowchart. First, the notification target detection unit 221 detects a notification target from the video data transmitted from the MEC server 21 (step S251). The analysis unit 222 analyzes the video data and derives detailed information of the analysis target person involved with the accident detected by the accident occurrence detection unit 211 of the MEC server 21 (step S252).

The determination unit 223 determines a coping method for coping with the analysis target person on the basis of the detailed information derived by the analysis unit 222 (step S253). The transmission/reception unit 224 notifies the notification target detected by notification target detection unit 221 of the coping method determined in step S253 (step S254). Note that either order of steps S251 and S252 may precede. However, in a case where the personal information of the analysis target person is acquired as the detailed information in step S252, a notification target may be added on the basis of the personal information as in the above-described hospital D. Therefore, step S252 may be executed first. Details of the processes in steps S251 to S254 are as described in the descriptions of the notification target detection unit 221 to the transmission/reception unit 224.

As described above, in a case where an accident occurs, the notification system S2 can analyze an analysis target person, determine a coping method, and provide a notification of the coping method, so that it is possible to realize a quick initial response with respect to the analysis target person.

The notification target detection unit 221 of the notification server 22 can detect a notification target present in a first region including a place where an accident has occurred, and the transmission/reception unit 224 can notify the detected notification target of a coping method. As described above, the notification server 22 detects not a notifier but a person or a vehicle present around the accident site and provides information to the person or the vehicle. Therefore, it is possible to obtain cooperation regarding a response with respect to an injured person or an urgent case from a non-notifier present around an accident site, a person who is not aware of the accident (for example, a person who is in a blind spot from an accident site), or the like. Therefore, it is possible to increase the survival probability of an injured person or an urgent case and suppress the poor prognosis.

The notification server 22 can notify at least one of a person or a vehicle of a coping method. Therefore, a person around the site or a person in the vehicle can immediately recognize the coping method and take action.

The determination unit 223 of the notification server 22 can execute, as determination of a coping method, at least one of determining first aid or a procedure for an analysis target person or specifying a place of a medical device that is used in the first aid or the procedure and is present in a region including an accident site. The transmission/reception unit 224 transmits this coping method to the notification target, and thus the notification target person can take a more appropriate response with respect to an injured person or an urgent case.

The notification target detection unit 221 of the notification server 22 can detect a notification target candidate as a notification target by determining that the notification target candidate appears in a video, and the transmission/reception unit 224 can notify a terminal associated with the detected notification target of a coping method. As a result, since the notification server 22 can notify a person present around the accident site, it is possible to increase the probability of care being given to an injured person or an urgent case.

The notification target may include an organization related to medical care or emergency. The determination unit 223 may determine the content of the coping method to be reported to such an organization to include at least one of a procedure for an analysis target person, a request for dispatch of a staff to a place where an accident has occurred, a request for acceptance of an analysis target person, or preparation for a procedure. As a result, the notification server 22 can cause an organization related to medical care or emergency to cope with an injured person or an urgent case, so that the injured person or the urgent case can receive a procedure at a specialized organization early or appropriately.

The analysis unit 222 may derive personal information associated with a registrant as detailed information by specifying an analysis target person from registrants on the basis of an authentication result of face authentication using a face image of the analysis target person appearing in a video and face information of the registrant. The determination unit 223 may determine a coping method on the basis of the personal information. Therefore, since the notification server 22 can report a coping method according to the characteristics of the individual, it can be expected that a response according to the circumstances of the injured person or the urgent case is made.

The personal information may include, for example, at least one of anamnesis, a clinical history, pregnancy status, an age, sex, a blood type, allergy information, a personal number, a primary medical institution, or an emergency contact. On the basis of such personal information related to medical care, the notification server 22 can report a detailed and accurate coping method.

The transmission/reception unit 224 may determine a notification target on the basis of personal information. As a result, since the notification server 22 allows a person or an organization that knows the situation of the analysis target person to respond with respect to the analysis target person, it is possible to appropriately care for the injured person or the urgent case.

The detailed information may include at least one of a state of consciousness, a respiratory state, a bleeding state, a fracture state, a burn state, a strong hit site, a spasm state, a walking state, a heartbeat state, a pulse state, or a body temperature state. On the basis of such detailed information related to medical care, the notification server 22 can report a detailed and accurate coping method.

The determination unit 223 can report different coping methods (first aid or a procedure) depending on whether a notification target is a non-medical person or a vehicle thereof (first type of candidate) or a medical person or a vehicle thereof (second type of candidate). Therefore, since the notification server 22 can report a coping method in consideration of the expertise of a notification target person, the possibility that the injured person or the urgent case can receive an appropriate emergency response is increased, and the notification can be made in consideration of the notification target person.

Note that the configuration and processing of the notification system S2 described in (2A) can be changed as follows. For example, even in a case where a notification target is a vehicle of a non-medical person, the determination unit 223 can determine a coping method similarly to a case where a notification target is a non-medical person.

In (2A), the notification target detection unit 221 adds the hospital D as a notification target according to the personal information acquired by the analysis unit 222 regardless of a distance from the accident site. However, the notification target detection unit 221 may not add the hospital D as a notification target in a case where the hospital D is not included in the region R1 or in a case where the hospital D is not included within a predetermined region from the accident site. Note that the predetermined region is stored in advance as a threshold for determination in the storage unit 225.

Instead of or in addition to the hospital D stored as the personal information, the notification target detection unit 221 may specify one or a plurality of emergency medical institutions according to a situation of the accident and set one or plurality of emergency medical institutions as notification targets. The coping method reported to the emergency medical institution includes at least one of a procedure for the analysis target person, a request for dispatch of a staff member to a place where an accident has occurred, or a request for acceptance of the analysis target person. In a case where the emergency medical institution returns unacceptable to the notification server 22 in response to the notification from the transmission/reception unit 224, the notification target detection unit 221 may reset another emergency medical institution as a new notification target. The transmission/reception unit 224 notifies the new notification target of the coping method. A method of resetting the notification target may be based on the priority stored in advance in the storage unit 225. Alternatively, the notification target detection unit 221 may determine a priority order on the basis of priority order formulation criteria stored in advance in the storage unit 225 and at least one of position information of the accident site or detailed information acquired by the analysis unit 222, and perform resetting on the basis of the priority order.

In (2A), although the case where an analysis target person has heart disease has been described above, the notification system S2 can be naturally applied to other situations. For example, in a case where the analysis unit 222 determines that an analysis target person is hitting his/her head in the event of an accident on the basis of video data captured by the cameras 20A and 20B, the determination unit 223 may cause "not moving his/her head" as first aid or a procedure to be included in the coping method. In a case where the analysis unit 222 determines that the bleeding of the analysis target person is severe on the basis of the video and determines that the blood type of the analysis target person is O type as the personal information, the determination unit 223 may cause "necessity of blood transfusion of O type" that is preparation for blood transfusion (preparation for a procedure) to be included in the coping method.

The MEC server 21 may be provided at any place on a communication path from the camera 20 to the notification server 22. For example, the MEC server 21 and the camera 20 may be connected via a wired line, and the MEC server 21 may be connected to the notification server 22 via 5G wireless communication. As another example, the camera 20 may be connected to the MEC server 21 installed near a 5G base station via 5G wireless communication, and the MEC server 21 and the notification server 22 may be connected via a wired line. Here, instead of installing the MEC server 21 near the 5G base station, the MEC server 21 may be installed in a predetermined regional unit or in a core network of the 5G system (5GC). Since the MEC server 21 is provided on the side closer to the camera 20 on the communication path, a distance over which a series of video data output from each camera 20 flows can be shortened. Therefore, it is possible to suppress a large amount of data from flowing through the network, reduce a network load, and suppress a communication delay.

The MEC server 21 may be provided alone, or a plurality of MEC servers 21 may be present in a geographically distributed state. The MEC server 21 may include at least one of the notification target detection unit 221, the analysis unit 222, or the determination unit 223 included in the notification server 22.

There may be a configuration in which the MEC server 21 is not be provided, the notification server 22 includes the accident occurrence detection unit 211, and the camera 20 directly transmits video data to the notification server 22.

In (2A), by determining that the cameras 20C and 20D are present in the region R1, the MEC server 21 determines that video data captured by the cameras 20C and 20D is also necessary for the processes of the notification server 22, and transmits the video data to the notification server 22. However, the MEC server 21 may transmit only the video data captured by the cameras 20A and 20B that have detected the accident to the notification server 22 without executing the determination. In this case, the notification target detection unit 221 of the notification server 22 sets the region R1 as the first region including the accident site by using map information around the accident site and criteria for setting the first region stored in the storage unit 225. The notification target detection unit 221 specifies that camera 20 that images the region R1 is the cameras 20A to 20D. As a result, the notification target detection unit 221 determines that the video data captured by the cameras 20C and 20D is also necessary for notification target detection, and requests the MEC server 21 to output the video data captured by the cameras 20C and 20D. The MEC server 21 transmits the video data captured by the cameras 20C and 20D to the notification server 22 on the basis of the request. The notification target detection unit 221 performs the above processes by using the video data.

(2B)

In (2B), variations different from (2A) will be described below. In the following description, portions different from those in (2A) will be described, and descriptions of the same portions as those in (2A) will be omitted as appropriate.

Figure 12:
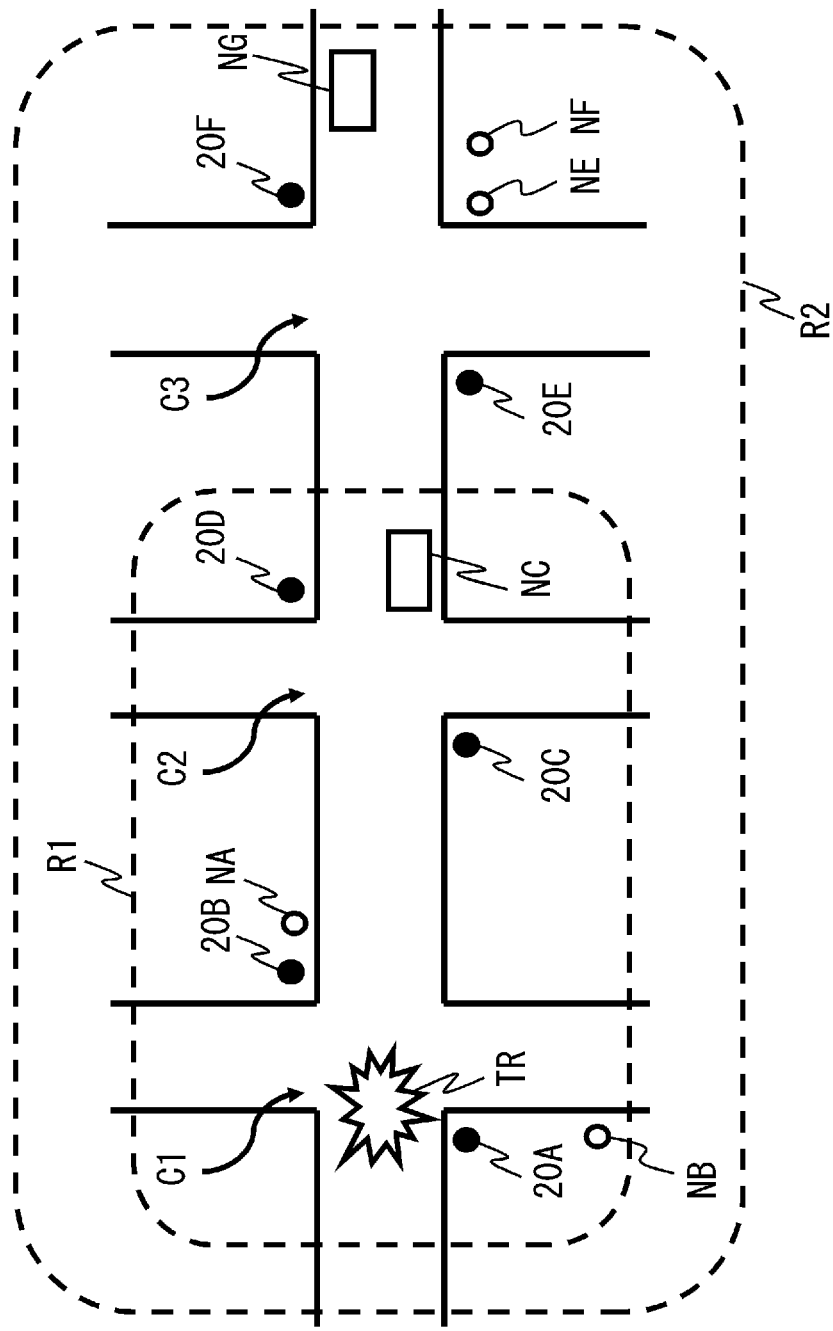
FIG. 12 is a schematic diagram illustrating an example of a road on which the camera according to the second example embodiment is provided.

FIG. 12 is a schematic diagram illustrating an example of a road on which the camera 20 is provided. FIG. 12 discloses, in addition to the elements illustrated in FIG. 6, a region R2 larger than the region R1, including the region R1 and the vicinity of the intersection C3. Hereinafter, a process will be described by using this example.

As described in (2A), the accident occurrence detection unit 211 of the MEC server 21 detects the occurrence of an accident from the video data captured by the cameras 20A and 20B. In this case, the accident occurrence detection unit 211 determines the region R1 as the first region including the accident site, and determines the region R2 as a second region including the accident site. The accident occurrence detection unit 211 transmits, to the notification server 22, not only video data captured by the cameras 20A to 20D related to the region R1 but also video data captured by the cameras 20E and 20F related to the region R2 from time point t3 to the present time via the transmission/reception unit 212.

Note that time point t3 is set similarly to time point t2 described above. Similarly to the "first region", any range may be set for the "second region". For example, the "second region" may be a circular region having a radius that is a predetermined distance longer than the "first region" from the accident site, or may be a region including the "first region" and located within a predetermined time at a predetermined walking speed or a vehicle speed from the accident site. The "second region" may be a predetermined section including the "first region" therein. The accident occurrence detection unit 211 may set the first and second regions by using, for example, the position information of the detected accident site, the map information of the periphery of the accident site stored in the storage unit 213, and the criteria for setting the first and second regions.

The notification target detection unit 221 detects a non-medical person or a vehicle (first type of candidate) of the non-medical person, which is a notification target candidate present in the first region and a medical person or a vehicle (second type of candidate) of the medical person, which is a notification target candidate present in the second region as notification targets. The notification target detection unit 221 analyzes the video data captured by the cameras 20A to 20F and compares the specifying information with the video data captured by the cameras 20A to 20F to determine whether or not the notification target appears in each piece of video data.

Similarly to (2A), the notification target detection unit 221 detects the medical person NA, the non-medical person NB, and the vehicle NC owned by the hospital C as notification targets present in the first region on the basis of the video data captured by the cameras 20A to 20D. The notification target detection unit 221 detects the medical person NE as a notification target that is present in the second region and is not present in the first region on the basis of the video data captured by the cameras 20E to 20F. With respect to the video data captured by the cameras 20E to 20F, the notification target detection unit 221 may set the specifying information of the medical personnel or the like as the analysis target and does not set the specifying information of the non-medical personnel or the like as the analysis target, thereby detecting the medical person NE as a notification target that is present in the second region and is not present in the first region, and not detecting the non-medical person NF. However, regarding the video data captured by the cameras 20E to 20F, the notification target detection unit 221 may set the non-medical person NF and the vehicle NG detected as a result of the analysis to be excluded from notification targets although specifying information of both the medical person and the non-medical person is an analysis target.

The analysis unit 222 executes processes similar to those in (2A). The determination unit 223 determines coping methods separately for a case where a notification target is the medical person NA, the vehicle NC, and the medical person NE (a medical person or a vehicle thereof), a case where a notification target is the non-medical person NB (ordinary person), and a case where a notification target is the hospital D (medical institution). This determination method is as described in (2A).

The transmission/reception unit 224 notifies the terminal 23E of a coping method including information regarding a procedure and information regarding a place of an AED present in the predetermined region. Here, the terminal 23E is a smartphone owned by the medical person NE, and contact information thereof is stored in the storage unit 225 in association with the medical person NE. The transmission/reception unit 224 notifies the terminals 23A to 23C similarly to (2A). The transmission/reception unit 224 notifies each notification target terminal 23 of the position information of the accident site received by the notification server 22 together with the coping method.

As described above, the notification target detection unit 221 can detect that the first type of candidate is present in the region R1 and that the second type of candidate is present in the region R2 as notification target candidates, and the transmission/reception unit 224 can notify the first type of candidate present in the region R1 and the second type of candidate present in the region R2 as notification targets of the coping method. It can be expected that the medical person or the like arrives at the accident site even at a position slightly away from the accident site because the aid of an injured person or an urgent case can be said to be a part of the job. On the other hand, since volunteers and the like of ordinary people are unfamiliar with aid and may have another job, there is a possibility that it is not realistic to seek rescue in a case where they are at a position slightly away from the accident site. In consideration of this point, the notification server 22 can change the detection region (that is, a range to seek rescue) according to an attribute of a notification target to increase a possibility of more aid for an injured person or an urgent case. However, the transmission/reception unit 224 may notify at least one of the first type of candidate present in the region R1 or the second type of candidate present in the region R2.

Note that an attribute of an individual specified as a notification target candidate is set such that the first type of candidate is a "non-medical person" and the second type of candidate is a "medical person", but is not limited to this example. For example, the second type of candidate may include a person whose job is to go to the accident site, such as a firefighter, a police officer, or a staff member of a company coping with an accident. The number of notification target candidates is not limited to two, and three or more types may be set, and correspondingly, three or more types of detection regions in which each type of candidate is to be detected by the notification target detection unit 221 may also be set. The predetermined region (third region) that is reported to be a place where various medical devices are present may be the same region as any of the plurality of set detection regions, or may be a region different from any of the plurality of set detection regions.

Third Example Embodiment

In a third example embodiment, an example in which a notification server acquires position information from a terminal possessed by a notification target candidate to detect a notification target will be described. In the following description, portions different from those in the second example embodiment will be described, and descriptions of the same portions as those in the second example embodiment will be omitted as appropriate.

Figure 13:
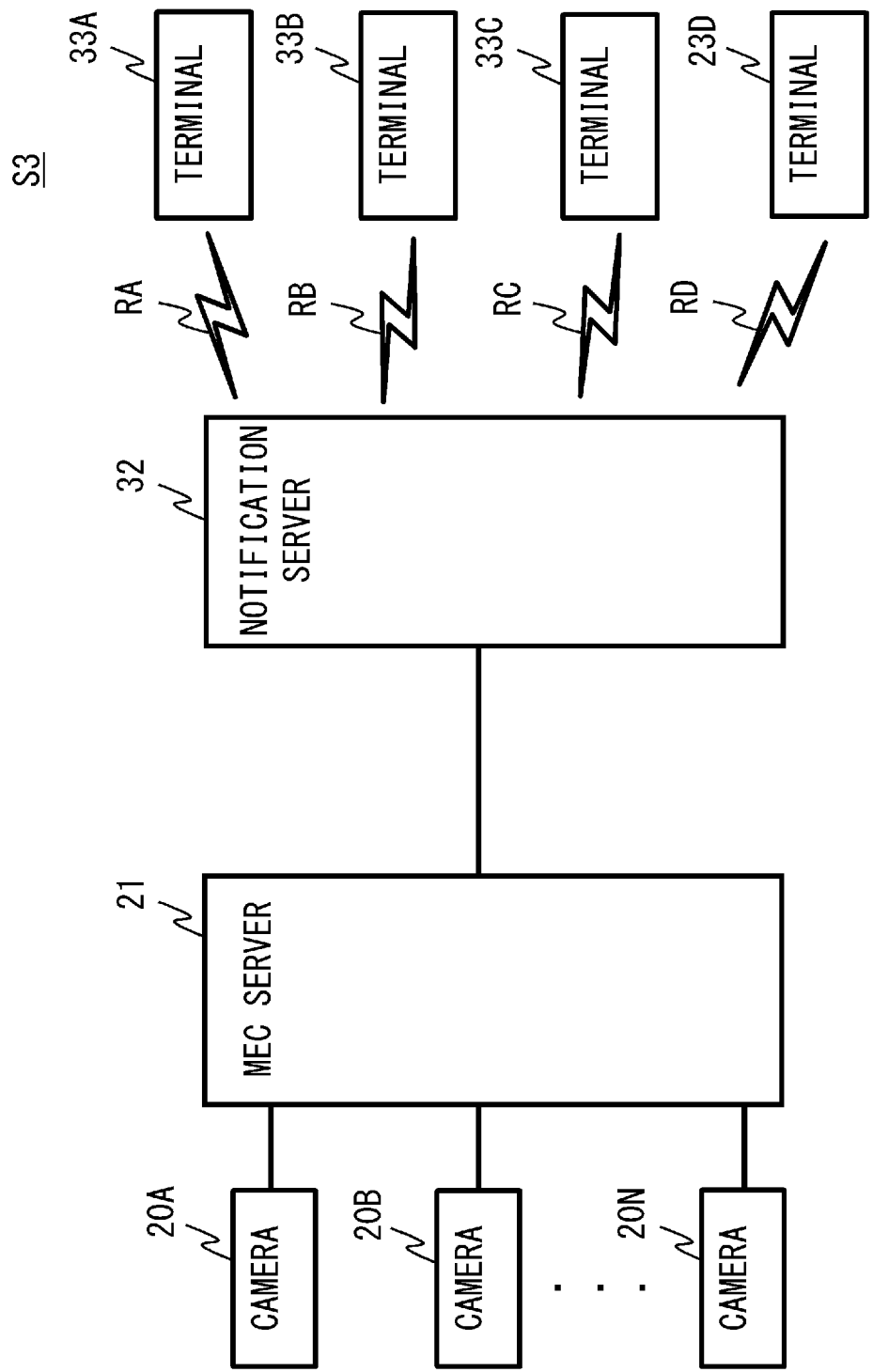
FIG. 13 is a schematic diagram illustrating an example of a notification system according to a third example embodiment.

FIG. 13 is a schematic diagram illustrating an example of a notification system. A notification system S3 includes cameras 20A to 20N, a MEC server 21, a notification server 32, and terminals 33A to 33C and 23D. Note that the terminals 33A to 33C will be collectively referred to as a terminal 33. Note that the camera 20 and the MEC server 21 have the configurations illustrated in FIGS. 5 and 7.

The camera 20 transmits the video data to the MEC server 21 as in (2A). Similarly to (2A), the accident occurrence detection unit 211 of the MEC server 21 also detects the occurrence of an accident by using the video data transmitted from the cameras 20A to 20N. As a result, the transmission/reception unit 212 transmits both of the video data of the cameras 20A and 20B that have imaged the intersection C1 where the accident has occurred and position information of the accident site to the notification server 22. However, the MEC server 21 does not need to determine the region R1 that is the first region including the accident site, and as a result, does not need to transmit the video data captured by the cameras 20C and 20D to the notification server 22. Therefore, the storage unit 213 does not need to store setting criteria and the like for the first region.

Figure 14:
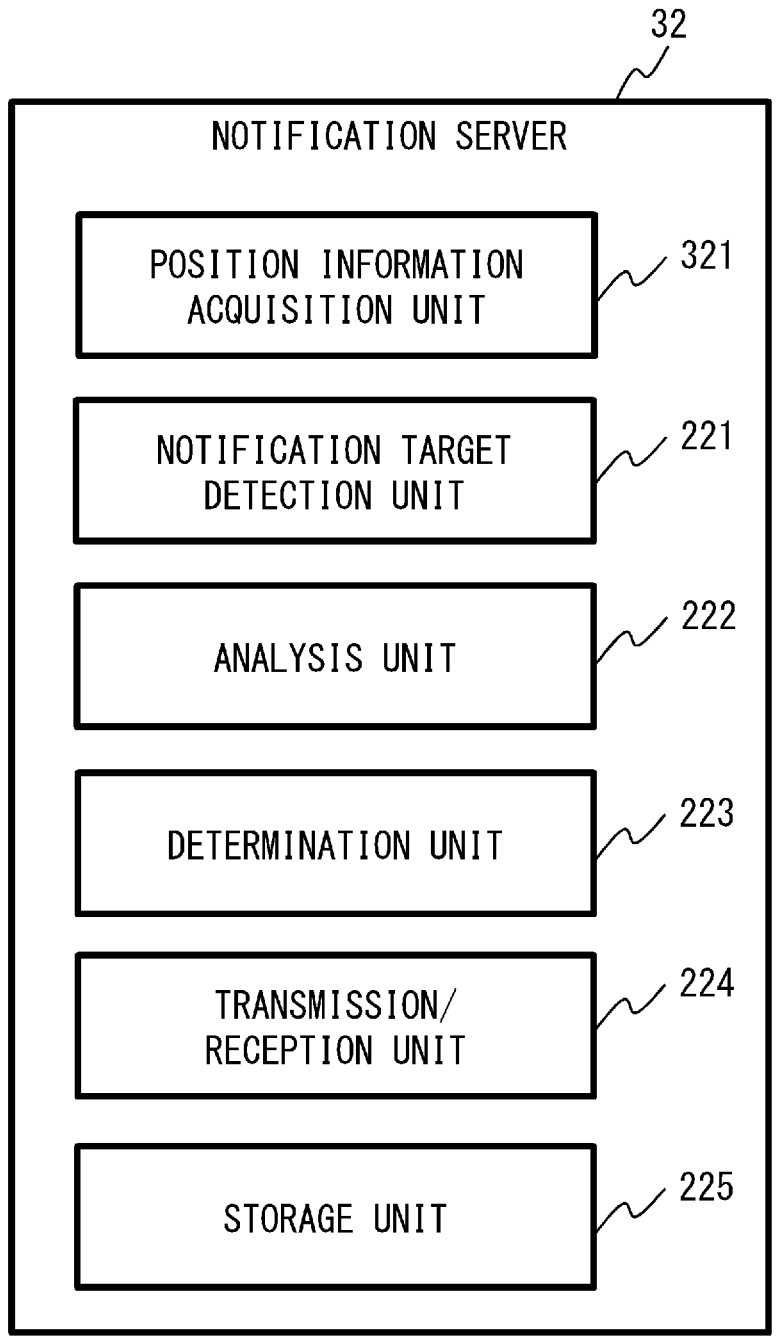
FIG. 14 is a block diagram illustrating an example of a notification server according to the third example embodiment.

FIG. 14 is a block diagram illustrating an example of notification server 32 according to the third example embodiment. The notification server 32 includes a position information acquisition unit 321 in addition to the configuration of the notification server 22 according to the second example embodiment.

The position information acquisition unit 321 acquires position information from a terminal 33 possessed by each notification target candidate. The position information acquisition unit 321 receives, from the transmission/reception unit 232 of the terminal 33, position information of the own terminal acquired by the terminal 33 by using a positioning technology such as a satellite positioning system such as a global positioning system (GPS) or an indoor positioning technology. This position information is updated at a predetermined timing.

The notification target detection unit 221 detects a notification target candidate present in the first region including the accident site on the basis of the latest position information of the terminal 33 acquired by the position information acquisition unit 321. The accident occurrence detection unit 211 may set the first region by using, for example, the position information of the detected accident site, the map information of the periphery of the accident site stored in the storage unit 225, and the criteria for setting the first region. Details of this method are as described in the second example embodiment. In a case where it is detected that a terminal associated with the notification target candidate (for example, a terminal owned by the candidate) is present in the first region, the notification target detection unit 221 detects that the notification target candidate is present in the first region.

For example, in the example illustrated in FIG. 6, the terminals 33A, 33B, and 33C owned by the medical person NA, the non-medical person NB, and the vehicle NC, which are notification target candidates, are located in the region R1 that is the first region. On the other hand, terminals 33E and 33F owned by the medical person NE and the non-medical person NF who are notification target candidates are located outside the region R1. The notification target detection unit 221 analyzes such a positional relationship between the region R1 and each terminal 33 on the basis of the position information of terminal 33 acquired by the position information acquisition unit 321. On the basis of this analysis, the notification target detection unit 221 detects the medical person NA, the non-medical person NB, and the vehicle NC as notification targets present in the region R1.

Processes executed by the analysis unit 222 and the determination unit 223 are similar to those in (2A). Similarly to (2A), the transmission/reception unit 224 also notifies the terminals 33A and 33C of a coping method including information regarding a procedure and information regarding a place of an AED present in the predetermined region, and notifies the terminal 33B of a coping method including information regarding first aid and information regarding the place of the AED present in the predetermined region. Here, the terminals 33A and 33B are smartphones owned by the medical person NA and the non-medical person NB, respectively, and the terminal 33C is a car navigation system mounted on the vehicle NC. Pieces of contact information of the terminals 33A, 33B, and 33C are stored in the storage unit 225 as information regarding notification target candidates in association with the medical person NA, the non-medical person NB, and the vehicle NC, respectively. Other processes executed by the transmission/reception unit 224 are similar to those in (2A), and thus descriptions thereof will be omitted.

Information necessary for processes executed by the notification target detection unit 221 to the transmission/reception unit 224 is stored in the storage unit 225. However, since the notification target detection unit 221 does not detect a notification target candidate from the video data of the camera, it is not necessary to store the specifying information for face authentication for specifying a predetermined individual or vehicle in the storage unit 225.

Figure 15:
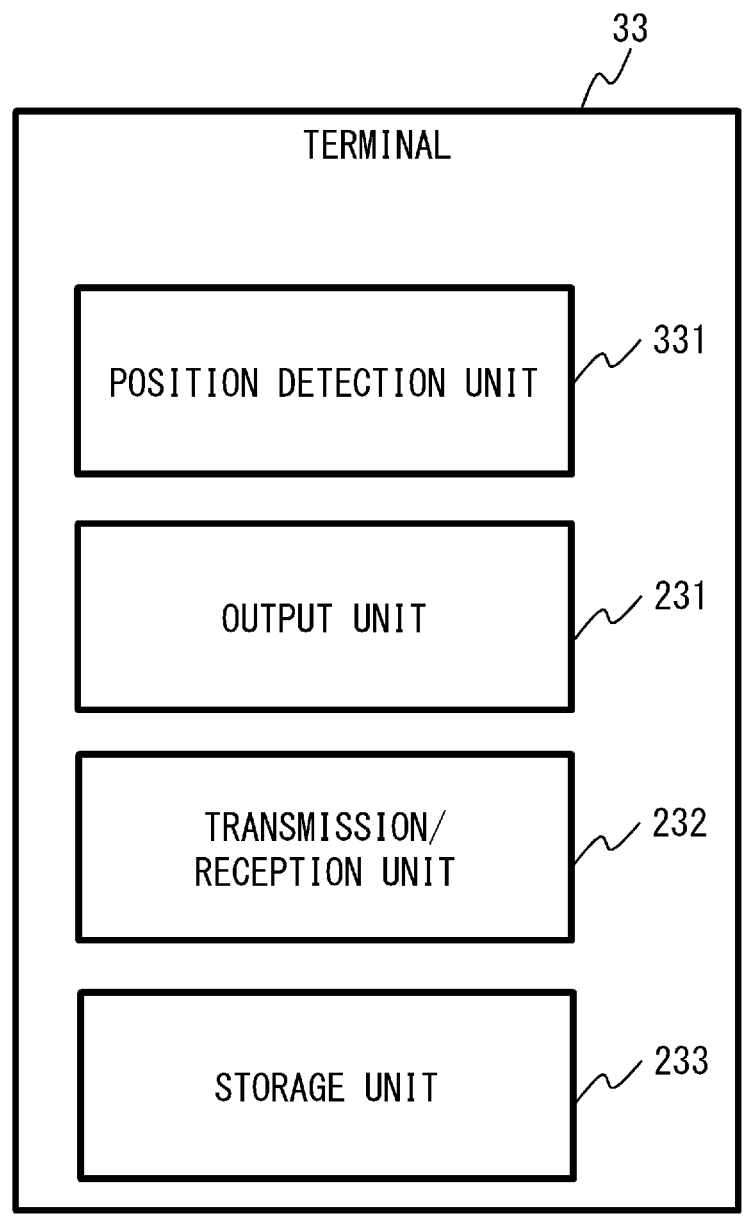
FIG. 15 is a block diagram illustrating an example of a terminal according to the third example embodiment.

FIG. 15 is a block diagram illustrating an example of the terminal 33. The terminal 33 further includes a position detection unit 331 in addition to the configuration of the terminal 23 according to the second example embodiment.

The position detection unit 331 updates the position information of the terminal 33 at a predetermined timing by using some positioning technology such as a satellite positioning system or an indoor positioning technology. In a case where the position information is updated, the position detection unit 331 transmits the own position information to the notification server 32 via the transmission/reception unit 232. A timing at which the position detection unit 331 transmits the position information to the notification server 32 may be at least one of a predetermined cycle or the time of detection of a predetermined event. In a case where the terminal 33 uses cellular wireless communication such as LTE or 5G, the predetermined event may be a change of a base station or a cell to be connected. The predetermined event may be movement of the terminal 33 by a predetermined distance, a predetermined time, a request from the notification server 32, or the like. The position detection unit 331 is realized, for example, by installing a notification application in the terminal 33 and causing the control unit of the terminal 33 to operate the application. Since processes executed by the output unit 231 to the storage unit 233 are similar to those in (2A), the descriptions thereof will be omitted. As an example, in a case where a notification application is installed in the terminal 33, the output unit 231 may display a coping method and position information of an accident site received from the notification server 32 as a push notification on a screen.

As described above, the position information acquisition unit 321 can acquire position information of the terminal from the terminal 33 possessed by a notification target candidate, and the notification target detection unit 221 can detect a notification target on the basis of the position information acquired by the position information acquisition unit 321. As a result, since the notification server 22 can also detect a notification target candidate that is not captured by the camera 20 and report a coping method to the notification target candidate, it is possible to further increase the number of notification destinations that can be notified of a coping method. Therefore, cooperation with aid of more people can be expected.

Note that, also in the third example embodiment, as described in (2B), two or more types of candidates to be notification targets may be set, and correspondingly, two or more types of regions in which respective types of candidates are to be detected by the notification target detection unit 221 may also be set. In the third example embodiment, the variations described in the second example embodiment can be applied as appropriate.

Fourth Example Embodiment

In a fourth example embodiment, an example in which a terminal notified of a coping method controls whether or not to output the reported coping method will be described. In the following description, portions different from those in the third example embodiment will be described, and descriptions of the same portions as those in the third example embodiment will be omitted as appropriate.

Figure 16:
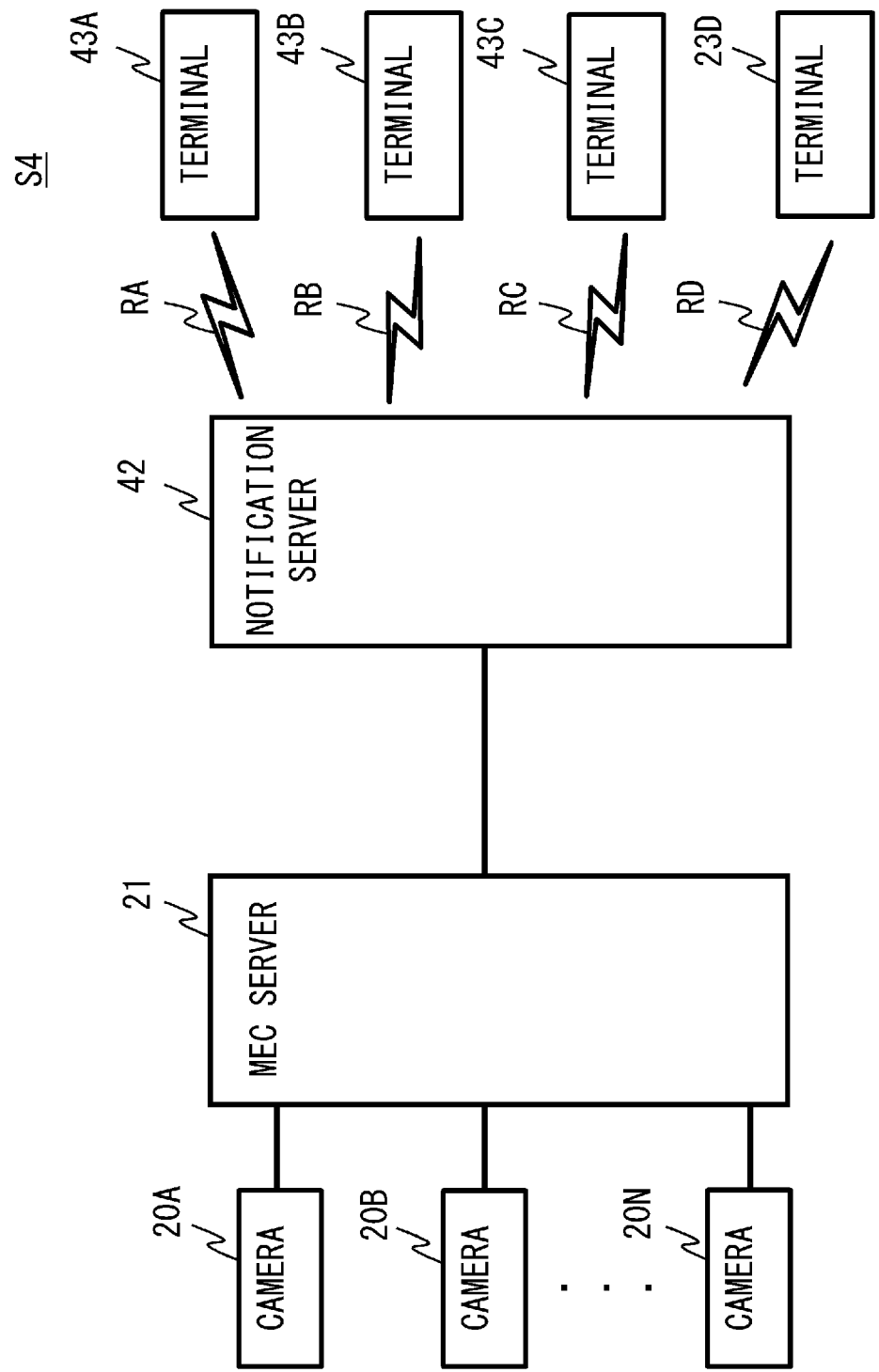
FIG. 16 is a schematic diagram illustrating an example of a notification system according to a fourth example embodiment.

FIG. 16 is a schematic diagram illustrating an example of a notification system. A notification system S4 includes cameras 20A to 20N, a MEC server 21, a notification server 42, and terminals 43A to 43C and 23D. Note that the terminals 43A to 43C will be collectively referred to as a terminal 43. The camera 20 and the MEC server 21 execute the same processes as those in the third example embodiment.

Figure 17:
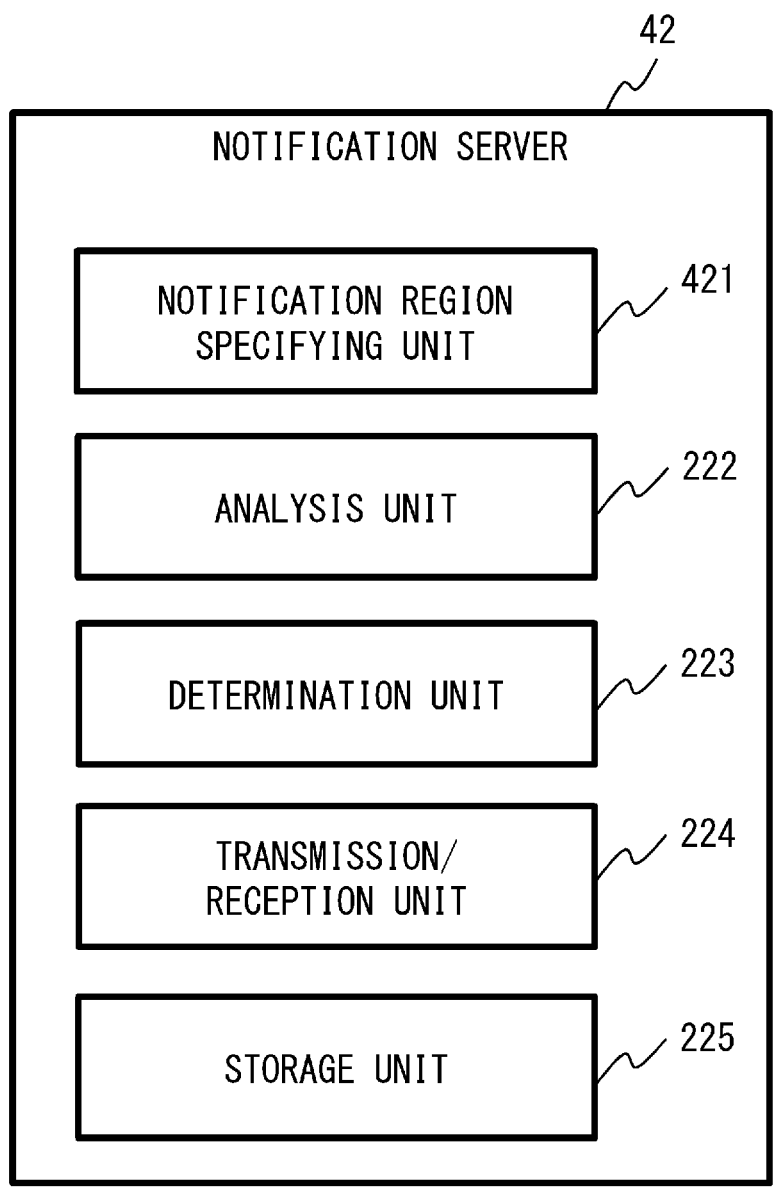
FIG. 17 is a block diagram illustrating an example of a notification server according to the fourth example embodiment.

FIG. 17 is a block diagram illustrating an example of the notification server 42 according to the fourth example embodiment. The notification server 42 includes a notification region specifying unit 421 instead of the notification target detection unit 221 of the notification server 22 according to the second example embodiment. In the second and third example embodiments, the notification server selects a notification target present in a predetermined detection region from among notification target candidates. On the other hand, the notification server 42 notifies all notification targets related to a registered person and vehicle of a coping method. Therefore, the notification server 42 does not need to include the notification target detection unit 221 for detecting a notification target.

The notification region specifying unit 421 sets the region R1 associated with a notification target on the basis of the position information of the accident site and the criteria for setting the first region stored in the storage unit 225. Details of this setting are as described above.

The analysis unit 222 of the notification server 42 performs the same processes as those in the second example embodiment. Similarly to the second example embodiment, the determination unit 223 also determines coping methods separately for a case where a notification target is the first type (for example, a medical person or a vehicle thereof), a case where a notification target is the second type (for example, an ordinary person), and a case where a notification target is a medical institution.

The transmission/reception unit 224 notifies all notification targets related to a person and a vehicle stored in the storage unit 225 of the coping method determined by the determination unit 223. As described above, the transmission/reception unit 224 notifies the first type of notification targets including the terminals 43A and 43C of the coping method including the information regarding a procedure and the information regarding the place of the AED present in the predetermined region. The transmission/reception unit 224 notifies the second type of notification target including the terminal 43B of the coping method including the information regarding the first aid and the information regarding the place of the AED present in the predetermined region. The transmission/reception unit 224 notifies the terminal 23D of the coping method including the procedure for the analysis target person and a request for acceptance of the analysis target person. Note that the first and second types of notification targets may be notified by unicast communication for each terminal, by multicast communication for each of the first or second types of notification targets, or by multicast communication in units of base stations or cells.

The transmission/reception unit 224 notifies each of the notification target terminals 43A to 43C and 23D of the position information of the accident site and the information regarding the region R1 set by the notification region specifying unit 421 together with the coping method.

Information necessary for processes executed by the notification region specifying unit 421 to the transmission/reception unit 224 is stored in the storage unit 225. For example, the storage unit 225 stores the following information.

(i) Information regarding a predetermined organization, individual, and vehicle that are notification targets, and terminal information of the organization, the individual, and the vehicle that are transmission destinations of a notification associated with each piece of the information (ii) Face information of a registrant for the analysis unit 222 to execute face authentication (iii) A list of position information in which various medical devices (for example, AEDs) are provided and criteria for setting a predetermined region (third region) associated with a notification target as a place where various medical devices are present (iv) Criteria for setting the first region A method in which the transmission/reception unit 224 determines a predetermined organization to be notified of the coping method on the basis of the information in (i) is as described in the second example embodiment. The storage unit 225 does not need to store specifying information for specifying a predetermined individual or vehicle.

Figure 18:
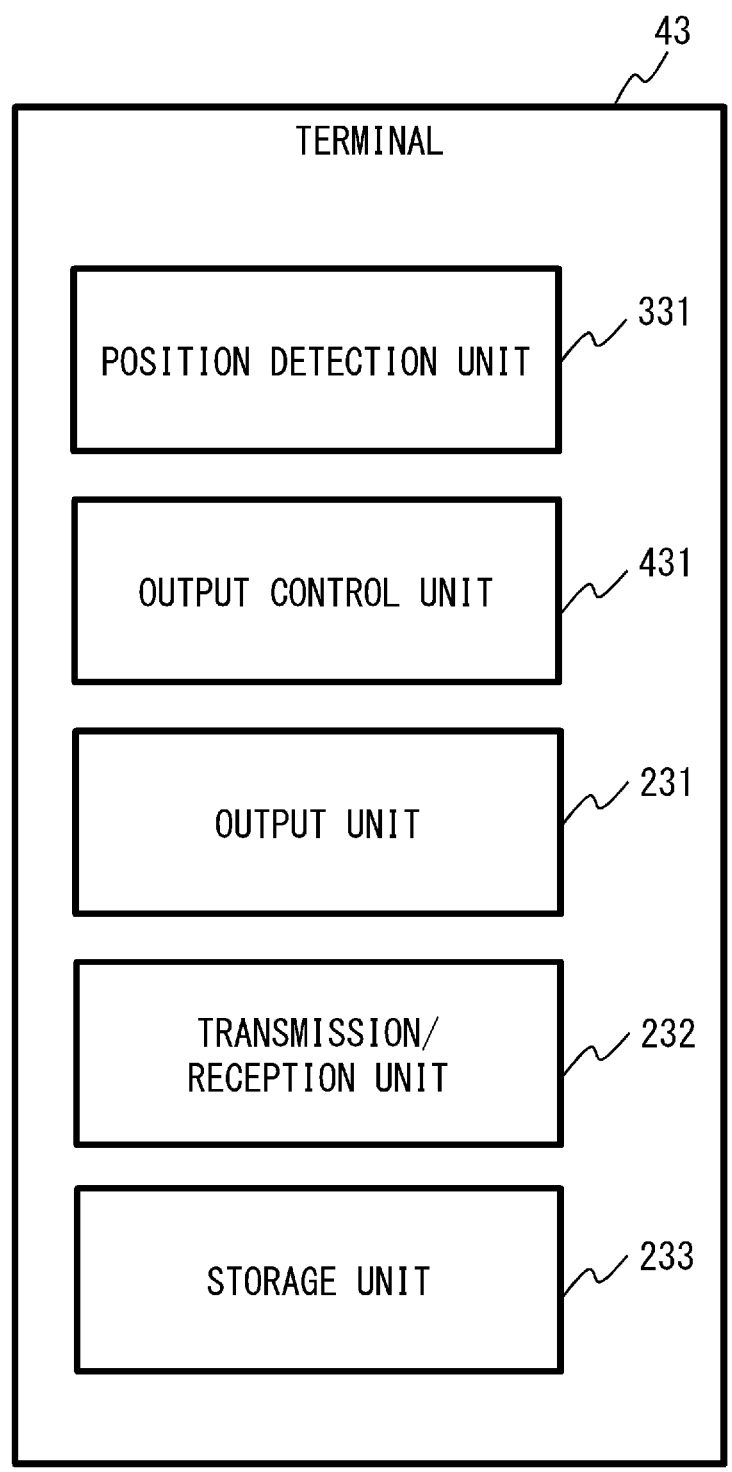
FIG. 18 is a block diagram illustrating an example of a terminal according to the fourth example embodiment.

FIG. 18 is a block diagram illustrating an example of the terminal 43. The terminal 43 further includes an output control unit 431 in addition to the configuration of the terminal 33 according to the third example embodiment.

The transmission/reception unit 232 receives the coping method, the position information of the accident site, and the information regarding the region R1 transmitted from the transmission/reception unit 224 of the notification server 42 to each terminal 43. The output control unit 431 compares the latest position information of the own terminal detected by the position detection unit 331 with the received information regarding the region R1, and determines whether the own terminal is within the region R1.

In a case where it is determined that the own terminal is within the region R1, the output control unit 431 performs control such that the output unit 231 outputs the coping method and the position information of the accident site received from the notification server 42. The output is performed, for example, as a push notification using the application. As a result, a user of the terminal 43 (that is, a notification target) can ascertain information such as a coping method. On the other hand, in a case where it is determined that the own terminal is outside the region R1, the output control unit 431 performs control such that the output unit 231 does not output the coping method and the position information of the accident site received from the notification server 42. Therefore, the user of the terminal 43 does not ascertain information such as a coping method. Processes executed by the terminal 43 are similar to those in the third example embodiment, and thus descriptions thereof will be omitted.

In the present example embodiment, since the notification server 42 does not need to specify a notification target, the notification server 42 can be configured more simply. A coping method or the like is output to a notification target person who is close to the accident site, but a coping method or the like is not output to a notification target person who is far from the accident site. Therefore, the burden on the notification target person who is far from the accident site can be reduced.

Note that, also in the fourth example embodiment, as described in (2B), two or more types of notification target candidates may be set, and correspondingly, the notification region specifying unit 421 may set two or more types of notification target regions for each type of candidate. For example, the notification region specifying unit 421 sets the region R1 for which the first type of notification target is notified of the coping method and the region R2 for which the second type of notification target is notified of the coping method on the basis of the position information of the accident site and the criteria for setting the first and second regions stored in the storage unit 225. In a case where a notification target is of the first type, the transmission/reception unit 224 notifies the information regarding the region R1 together with the coping method and the like, and in a case where a notification target is of the second type, the transmission/reception unit 224 reports the information regarding the region R2 together with the coping method and the like.

The transmission/reception unit 232 receives the coping method, the position information of the accident site, and the information regarding the region R1 or R2 transmitted from the transmission/reception unit 224 of the notification server 42 to each terminal 43. The output control unit 431 compares the latest position information of the own terminal detected by the position detection unit 331 with the received position information of the region R1 or R2, and determines whether the own terminal is within the region R1 or R2. The output control unit 431 performs the above-described control according to a determination result. Note that the storage unit 233 of the terminal 43 may store attribute information indicating whether the terminal is a notification target of the first type or the second type. The output control unit 431 may determine which one of the region R1 and the region R2 is to be used in the above-described determination related to the position of the own terminal on the basis of the attribute information. As a result, for example, the coping method is output to a terminal of a medical person even if the terminal is far from the accident site to some extent, whereas the coping method is not output to a terminal of a volunteer of ordinary people or the like if the terminal is far from the accident site to some extent.

Note that the notification server 42 does not have to include the notification region specifying unit 421. In this case, for example, the transmission/reception unit 224 notifies the terminal 43 of each notification target of the position information of the accident site and the criteria for setting the first region together with the coping method. The output control unit 431 sets the region R1 associated with a notification target on the basis of the received position information of the accident site and the criteria for setting the first region. The latest position information of the own terminal detected by the position detection unit 331 is compared with the position information of the region R1 to determine whether the own terminal is within the region R1. Even in this case, it is possible to prevent the coping method and the like from being output to a notification target person who is far from the accident site. This control can also be performed even in a case where other regions such as the region R2 are set instead of the region R1. Note that the criteria for setting the first region may be stored in advance in the storage unit 233 of the terminal 43. In this case, the transmission/reception unit 224 does not need to notify the terminal 43 of the criteria for setting the first region together with the coping method and the position information of the accident site.

As for other variations of the fourth example embodiment, those described in the second and third example embodiments can be applied as appropriate.

Fifth Example Embodiment (5A)

In a fifth example embodiment, an example in which a notification server uses a configuration of a network to notify a notification target near an accident site of a coping method will be described. In the following description, portions different from those in the second example embodiment will be described, and descriptions of the same portions as those in the second example embodiment will be omitted as appropriate.

A notification system according to the fifth example embodiment is as illustrated in FIG. 4, and a configuration of each device related to FIG. 4 is as illustrated in FIGS. 5, 7, 8, and 9. However, the notification server 22 executes a process different from that in the second example embodiment as follows.

The notification target detection unit 221 specifies one or a plurality of base stations such that the location of an accident site is included in a cell of an own station. The notification target detection unit 221 specifies a base station by comparing position information that is associated with identification information of each base station and is covered by the cell of each base station with the position of the accident site. As position information covered by the cell of each base station, position information stored in the storage unit 225 may be used, or position information stored in another database or the like may be acquired and used by the notification target detection unit 221. Consequently, the notification target detection unit 221 detects notification targets by setting all terminals under the control of the specified base station as the notification targets.

The analysis unit 222 executes a process similar to that in the second example embodiment. In a case where notification targets are all terminals under the control of the specified base station, the determination unit 223 determines a coping method including both a coping method for the first type of candidate (non-medical person) and a coping method for the second type of candidate (medical person). However, the determination unit 223 may cause either of the coping method for the first type of candidate and the coping method for the second type of candidate to be included in the coping method. Details thereof are as described in the fourth example embodiment. In a case where a notification target is the hospital D, the determination unit 223 determines a coping method as described in the second example embodiment.

The transmission/reception unit 224 may notify all the terminals under the control of the base station specified by the notification target detection unit 221 of the coping method determined by the determination unit 223 and the position information of the accident site by using broadcast communication or multicast communication. As the broadcast communication or the multicast communication, for example, evolved Multimedia Broadcast Multicast System (eMBMS) or Single Cell Point To Multipoint (SC-PTM) may be used in a case of an LTE network, and Further evolved Multimedia Broadcast Multicast Service (FeMBMS) may be used in a case of a 5G network. As described in the second example embodiment, the hospital D that is a notification target is notified of the coping method and the position information of the accident site.

Information necessary for processes executed by the notification target detection unit 221 to the transmission/reception unit 224 is stored in the storage unit 225. Specifically, the following information is stored.

(i) Information regarding a predetermined organization that is a notification target candidate and terminal information of the organization that is a transmission destination of a notification associated therewith (ii) Face information of a registrant for the analysis unit 222 to execute face authentication
(iii) A list of position information in which various medical devices (for example, AEDs) are provided, and criteria for setting a predetermined region (third region) associated with a notification target as a place where various medical devices are present The storage unit 225 may store position information covered by a cell of each base station and map information of a place where the camera 20 managed by the notification server 22 is arranged.

The terminal 23 that has received the coping method and the position information of the accident site from the notification server 22 outputs these pieces of information to a display or the like as described in the second example embodiment. As described above, the notification server 22 can notify an unspecified number of users having terminals under the control of the base station of a coping method or the like. Therefore, it is possible to increase a probability of aiding an injured person or an urgent case.

Note that one or a plurality of base stations specified by the notification target detection unit 221 may be either a macrocell base station having the largest cell scale or a small cell base station having a cell scale (for example, a microcell, a picocell, or a femtocell) smaller than the one of the macrocell base station, or may include both of them. The notification target detection unit 221 may set not only a base station such that the position of the accident site is included in its own cell but also a nearby base station such as a base station adjacent thereto as a specifying target. For other variations, those described in the previous example embodiment can be applied as appropriate.

(5B)

Instead of setting all terminals under the control of the specified base station as notification targets, the notification target detection unit 221 may acquire information regarding a terminal that is under the control of the base station and to which a service is provided by a specific mobile communication operator (communication carrier) and detect the terminal as a notification target. For example, in a 4G network, a home subscriber server (HSS) in a core network manages subscriber information of a communication carrier, and a mobility management entity (MME) in the core network manages position information of a terminal and handover between base stations (user movement management). Therefore, by communicating with the HSS and the MME, the notification target detection unit 221 can acquire information regarding a terminal that is under the control of a specific base station and is provided with a service from a specific communication carrier.

As another example, in a 5G network, a unified data management (UDM) that is one of network functions manages subscriber information of a communication carrier, and an access and mobility management function (AMF) that is one of network functions manages position information of a terminal and handover between base stations (user movement management). Therefore, by communicating with the UDM and the AMF, the notification target detection unit 221 can acquire information regarding a terminal that is under the control of a specific base station and is provided with a service from a specific communication carrier. In the case of a 5G network, the notification target detection unit 221 may acquire information regarding a terminal via a network exposure function (NEF) that is a mechanism for disclosing network functions and information in the 5G system to applications outside the 5G system.

The analysis unit 222 and the determination unit 223 execute processes similar to those in (5A). The transmission/reception unit 224 notifies all the terminals specified by the notification target detection unit 221 of the coping method determined by the determination unit 223 and the position information of the accident site. This notification method may employ unicast communication, or an emergency call mechanism in a mobile network may be used.

Even with the above configuration, the notification server 22 can notify an unspecified number of users having terminals under the control of the base station of a coping method or the like.

(5C)

Also in the fifth example embodiment, two or more types of notification target candidates may be set, and correspondingly, two or more types of regions for which the notification target detection unit 221 sets each type of notification target candidate as a notification target may also be set. The first type of notification target is, for example, a non-medical person, and the second type of notification target is, for example, a medical person.

Figure 19:
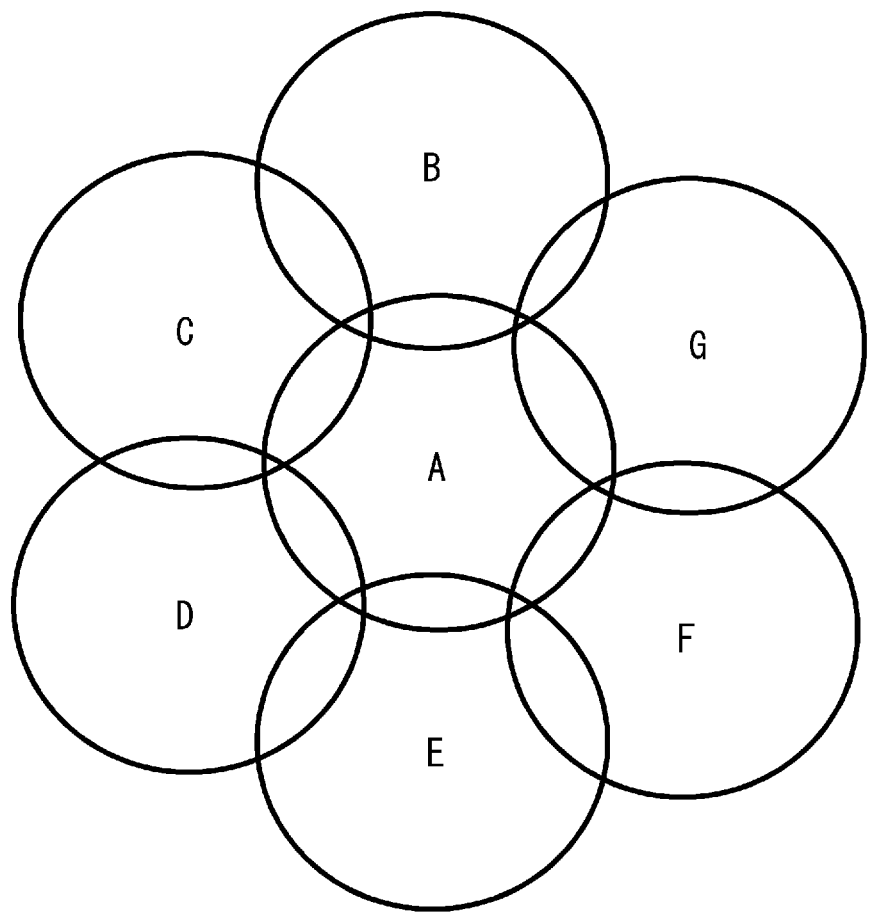
FIG. 19 is a schematic diagram illustrating a configuration example of a cell of a base station according to a fifth example embodiment.

FIG. 19 illustrates a configuration example of a cell of a base station for describing a region associated with a notification target. In this example, the notification target detection unit 221 specifies a base station A such that a position of the accident site is included in its own cell A. The notification target detection unit 221 further specifies base stations B to G (base stations located in the vicinity of the base station A) forming the respective cells by specifying cells B to G adjacent to the cell A. As described in (5A), the notification target detection unit 221 performs a base station specifying process by using position information covered by the cell of each base station.

The storage unit 225 stores a correspondence relationship between identification information of the first and the second types of candidate terminals and the type of notification target (information indicating whether a notification target is of the first type or the second type). The storage unit 225 further stores criteria for setting the first region that is a region for which a notification of a coping method is provided to the first type and criteria for setting the second region that is a region for which a notification of a coping method is provided to the second type of candidate.

The notification target detection unit 221 sets, as a notification target, a terminal that is a candidate accommodated in the cell A and stored in the storage unit 225 as the first type of candidate, and sets, as a notification target, a terminal that is a candidate accommodated in the cells A to G and stored in the storage unit 225 as the second type of candidate. Specifically, the notification target detection unit 221 specifies the cell A as the first region and the cells A to G as the second region by using the criteria for setting each region. The notification target detection unit 221 acquires identification information (for example, a telephone number) of a terminal connected to each base station from an LTE or 5G network device. By using the acquired identification information of each terminal, the notification target detection unit 221 specifies whether information regarding each terminal is stored in the storage unit 225 or, in a case where the information is stored, of what type of notification target the terminal is. The notification target detection unit 221 can detect the first type of candidate terminal accommodated in the cell A and the second type of candidate terminal accommodated in the cell B as notification targets on the basis of the specified type of notification target. A method of notifying these notification targets of a coping method is as described above.

Note that the notification target detection unit 221 may execute similar processes not only in (5A) but also in (5B). In (5B), the notification target detection unit 221 acquires identification information of a terminal that is under the control of the specific base station and that is provided with a service from a specific communication carrier, and specifies the type of notification target in the terminal indicated by the identification information. Consequently, the notification target detection unit 221 can detect each type of candidate terminal as a notification target. As for other variations of the fifth example embodiment, those described in the second to fourth example embodiments can be applied as appropriate.

Sixth Example Embodiment (6A)

In the second to fourth example embodiments, in a case where a coping method is reported by using unicast communication, the notification server 22 may change a region associated with a notification target according to whether a terminal that is a notification target candidate is owned by an individual or mounted on a vehicle.

For example, in the second example embodiment, a non-medical person or a vehicle is detected as a notification target by the notification target detection unit 221 in a case where the non-medical person or the vehicle is located in the region R1, but is not detected as a notification target in a case where the non-medical person or the vehicle is located outside the region R1. However, even in a case where the non-medical person's vehicle is located in a predetermined region larger than the region R1, the notification target detection unit 221 may detect the notification target candidate as a notification target. In a case where the region R2 (refer to FIG. 12) is set as a detection region related to a vehicle of a non-medical person, the notification target detection unit 221 may also detect the vehicle NG as a detection target.

Similarly, even in a case where a vehicle of a medical person is a candidate vehicle and is located in a predetermined region larger than the region R2, the notification target detection unit 221 may detect the vehicle as a notification target. Note that whether a notification target candidate is an individual or a vehicle is included in terminal information of the notification target candidate stored in the storage unit 225. Criteria for setting a detection region in a case where a notification target candidate is a vehicle are also stored in the storage unit 225. The notification target detection unit 221 can use these pieces of information to set a detection region and detect a notification target. For example, the notification target detection unit 221 may set a detection region to be larger in the order of a detection region related to a vehicle of a medical person, a detection region related to a vehicle of a non-medical person, a detection region related to an individual who is a medical person, and a detection region related to an individual who is a non-medical person. In this order, the order of the "detection region related to a vehicle of a non-medical person" and the "detection region related to an individual who is a medical person" may be reversed, or both regions may be regions having the same area.

As described above, the notification server 22 can change and set a detection region depending on whether a notification target candidate is an individual or a vehicle. In a case where a notification target person is riding on a vehicle that can move earlier than walking, it is expected that the notification target person will be in time to aid an injured person or an urgent case even if the notification target person is far from the accident site to some extent. Thus, regarding a terminal mounted on a vehicle, it is possible to obtain cooperation of more people by setting a detection region larger than a terminal possessed by an individual.

In the above example, a detection region is changed depending on whether a notification target is an individual or a vehicle, but a detection region may be set for each of three or more types of notification target candidates. For example, the notification target detection unit 221 may divide detection target candidates into an individual, a bicycle, and an automobile, and set the detection target candidates such that detection regions are widened toward the latter. In a case where a notification target candidate is an individual, the same detection region may be set regardless of whether the notification target candidate is a non-medical person or a medical person. The same applies to a case where a notification target candidate is a vehicle. That is, the "first type of candidate" may be an individual, and the "second type of candidate" may be a vehicle.

(6B)

In the third example embodiment, the position information acquisition unit 321 of the notification server 32 may generate a movement history of a user (that is, a notification target candidate) using a terminal on the basis of position information acquired at a predetermined timing. On the basis of the movement history, the notification target detection unit 221 may analyze moving means (for example, walking or a car) or an average speed of the notification target candidate and set a detection region on the basis of the analysis.

For example, the notification target detection unit 221 determines, on the basis of the movement history, that a terminal NH possessed by a certain medical person H is moving at 30 km/h on average in a period from the present time (at the time of execution of this process in the notification target detection unit 221) to a predetermined past timing. The storage unit 225 stores "15 km/h" as a threshold value of the average speed. When it is determined that an average speed of the terminal NH is equal to or higher than the threshold value, the notification target detection unit 221 estimates that the terminal NH (that is, the medical person H) is moving by an automobile. Therefore, the notification target detection unit 221 can set a detection region for the terminal NH to a larger region for a vehicle instead of the region R2 for an individual who is a medical person.

On the other hand, in a case where the notification target detection unit 221 determines that the terminal NH is moving at an average speed of 5 km/h in a period from the present time to a predetermined past timing, the average speed of the terminal NH is determined to be less than the threshold value. In this case, the notification target detection unit 221 estimates that the terminal NH is moving on foot, and the notification target detection unit 221 sets a detection region for the terminal NH to the region R2 for an individual who is a medical person. Note that the notification target detection unit 221 may also change a detection region for a terminal possessed by a non-medical person or a terminal provided in a vehicle by using a similar logic.

As described above, in a case where a notification target candidate is in a state of easily moving, that is, in a state of being able to move fast, the notification server 22 may change and set a detection region so that the detection region is wider. Therefore, cooperation of more people can be obtained in terms of aid.

A detection region may be changed in three or more stages instead of two stages. In a case where notification target candidates are moving at the same speed, the same detection region may be set regardless of whether the candidate is a non-medical person or a medical person.

The present invention is not limited to the above example embodiments, and can be changed as appropriate without departing from the concept thereof. For example, the inventions according to the first to sixth example embodiments can be combined in whole or in part as appropriate.

The notification device 10 according to the first example embodiment or the notification server according to the second to sixth example embodiments may notify a terminal of a notification target of detailed information (information such as information regarding a body condition of an analysis target person and at least part of personal information) that is an analysis result from the analysis unit together with the above-described coping method. Instead of or in addition to the detailed information, the terminal of the notification target may be notified of a video of the analysis target person captured by the camera as a still image or a moving image together with the coping method. As a result, since a user who has visually recognized the terminal can ascertain a state of the analysis target person, more appropriate aid can be performed.

The notification device 10 according to the first example embodiment or the notification server according to the second to sixth example embodiments may further transmit a questionnaire for inquiring detailed information (for example, eyewitness information) regarding the accident to the terminal notified with the coping method. The notification device 10 or the notification server can store the detailed information regarding the accident by receiving answers to the questionnaire from the terminal. This information can be shared by all concerned related to aid, such as a hospital where an analysis target person is carried, an emergency department, a fire department, and the police.

In the second, third, fifth, and sixth example embodiments, the analysis unit 222 may determine the severity of an accident on the basis of at least one of the degree of injury or illness of an analysis target person or the number of analysis target persons (injured persons or urgent cases). The notification target detection unit 221 may change a detection region on the basis of the severity.

In the case of the example in (2A), "4 people" may be stored in the storage unit 225 as a threshold value of the severity of an accident. Here, in a case where the analysis unit 222 determines that there is one injured person in an accident, since the number of injured persons in the accident is less than the threshold value, the analysis unit 222 determines that the severity of the accident is "low". In this case, the notification target detection unit 221 leaves a detection region as the region R1. On the other hand, in a case where it is determined that the number of injured persons in the accident is seven, since the number of injured persons in the accident is equal to or more than the threshold value, the analysis unit 222 determines that the severity of the accident is "high". In this case, the notification target detection unit 221 sets a detection region to a predetermined region (for example, region R2) larger than the region R1. Similar processes may be executed in the third example embodiment. Since notification target candidates are classified into two or more types, even in a case where different detection regions are set in advance for each type of candidate, the notification target detection unit 221 can execute similar processes on the basis of the severity of the accident on at least one of the plurality of detection regions.

In the example in (5A), in a case where the analysis unit 222 determines that the severity of the accident is "low", the notification target detection unit 221 specifies one or a plurality of base stations such that the position of the accident site is included in the cell of the own station. On the other hand, in a case where the analysis unit 222 determines that the severity of the accident is "high", the notification target detection unit 221 sets, as specifying targets, not only the base station such that the position of the accident site is included in the cell of the own station but also nearby base stations such as one or a plurality of base stations (for example, macrocell base stations) adjacent thereto.

As described above, since the notification target detection unit 221 can change a detection region on the basis of the severity of the accident, the higher the severity of the accident, the more cooperators can be gathered. Therefore, it is possible to increase a probability that an appropriate initial response will be made even against a serious accident. The severity of the accident may be determined in three or more stages, and a detection region may be changed in three or more stages accordingly.

In a case where the number of notification targets present in an original detection region is less than a predetermined threshold value, the notification target detection unit 221 may expand the detection region from the original detection region and detect a notification target candidate present in the new target detection region as a new notification target. The predetermined threshold value used for this determination is stored in the storage unit 225. The notification target detection unit 221 may continuously repeat the process of expanding the detection region until the number of the notification targets present becomes equal to or more than the predetermined threshold value. The notification target detection unit 221 may execute this process even in a case where a notification target is specified by using any of the methods described in the example embodiments, that is, the video data from the camera, the position information from the terminal 23, and the base station information. Since notification target candidates are divided into two or more types, even in a case where different detection regions are set in advance for each type of candidate, similar processes of changing a detection region may be executed for at least one of the plurality of detection regions. As a result, the notification server 22 can reliably secure a staff who can participate in an initial response to the accident.

The notification device 10 according to the first example embodiment or the notification server according to the second to sixth example embodiments may notify terminals other than terminals of an individual, a vehicle, and an organization of a coping method. Taking the second example embodiment as an example, the notification server 22 may notify a digital signage terminal in a predetermined region including an accident site of a coping method for the first type of notification target (non-medical person) and position information of the accident site on the basis of the position information of the accident site and map information indicating positions of one or a plurality of digital signage terminals stored in the storage unit 225. The digital signage terminal that has received the notification outputs the coping method and the position information of the accident site by a screen, a voice, or the like. In a case where a passerby recognizes the digital signage terminal, the passerby is expected to make an initial response with respect to an injured person or an urgent case. Note that the predetermined region may be stored in the storage unit 225.

Note that this notification provided to the digital signage terminal may be provided in a case where the number of notification targets such as an individual and a vehicle present in the detection region initially set by the notification target detection unit 221 is less than a predetermined threshold value. The predetermined region including the digital signage terminal that is a notification target may be widened as the severity becomes higher on the basis of the above-described severity of the accident determined by the analysis unit 222.

The notification server 22 may report the coping method and the position information of the accident site by using a disaster prevention radio speaker similarly to the example of the digital signage terminal. The speaker outputs the coping method and the position information of the accident site to surrounding persons by voice.

In the second to fourth, and sixth example embodiments, the processes according to the fifth example embodiment may be performed in a case where the number of notification targets such as an individual and a vehicle present in the detection region initially set by the notification target detection unit 221 is less than a predetermined threshold value.

The notification target detection unit 221 may exclude a notification target candidate that satisfies a certain condition from notification targets on the basis of map information stored in the storage unit 225. For example, in a case where an accident site is an ordinary road, whereas a notification target candidate that is present geographically in the vicinity of the accident site is on an expressway or on a railway of a train (that is, a notification target person is on a train), the notification target person cannot rush to the accident site immediately. The notification target detection unit 221 detects such a case by referring to information regarding a place where the notification target candidate is present from the map information, and excludes the notification target candidate from selection of a notification target.

In a case where a vehicle is notified of a coping method regardless of a non-medical person or a medical person, the transmission/reception unit 224 may extract information regarding a parking space near the accident site on the basis of the map information stored in the storage unit 225 and notify the terminal 23 of the vehicle of the information together with the coping method. As a result, in a case where a user of the vehicle approaches the accident site, the user can stop the vehicle immediately and go to the site, so that more rapid aid can be performed.

In the example embodiments described above, the present disclosure has been described as a hardware configuration, but the present disclosure is not limited thereto. In the present disclosure, the processes (steps) of the device (any one of the notification device, the notification server, the MEC server, the camera, and the terminal) described in the above-described example embodiments can also be realized by causing a processor in a computer to execute a computer program.

Figure 20:
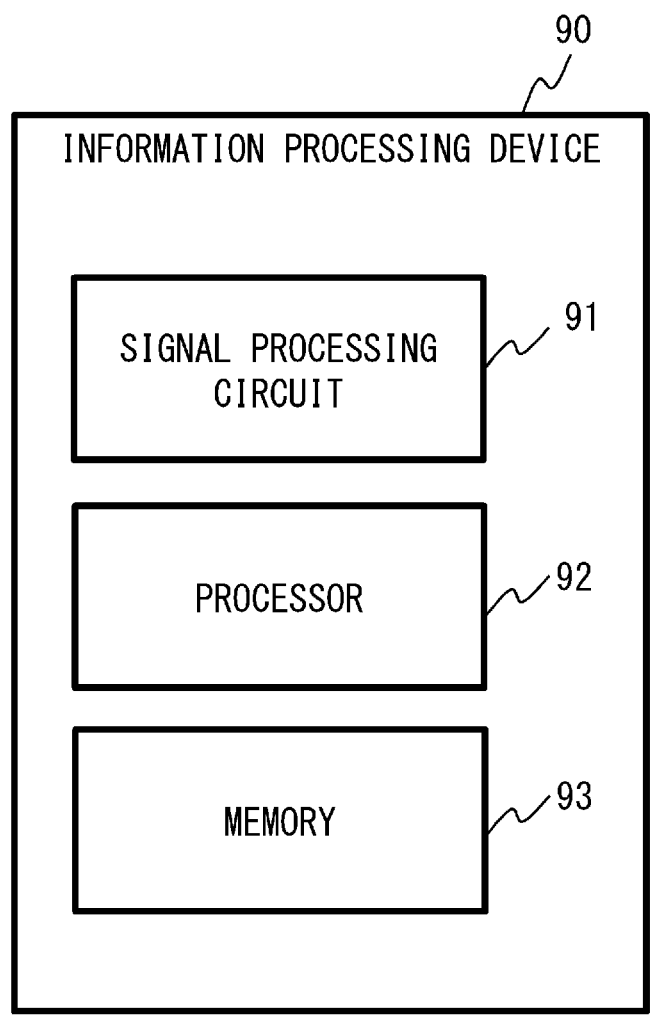
FIG. 20 is a block diagram illustrating an example of a hardware configuration of an apparatus according to each example embodiment.

FIG. 20 is a block diagram illustrating a hardware configuration example of an information processing device (signal processing device) in which the processes in each example embodiment described above are executed. Referring to FIG. 20, an information processing device 90 includes a signal processing circuit 91, a processor 92, and a memory 93.

The signal processing circuit 91 is a circuit for processing a signal under the control of the processor 92. The signal processing circuit 91 may include a communication circuit that receives a signal from a transmission device.

The processor 92 reads and executes software (computer program) from the memory 93 to execute the processing in the device described in the above-described example embodiments. As an example of the processor 92, one of a central processing unit (CPU), a micro processing unit (MPU), a field-programmable gate array (FPGA), a demand-side platform (DSP), or an application specific integrated circuit (ASIC) may be used, or a plurality of processors may be used in combination.

The memory 93 includes a volatile memory, a nonvolatile memory, or a combination thereof. The number of memories 93 is not limited to one, and a plurality of memories may be provided. The volatile memory may be, for example, a random access memory (RAM) such as a dynamic random access memory (DRAM) or a static random access memory (SRAM). The nonvolatile memory may be, for example, a random only memory (ROM) such as a programmable random only memory (PROM) or an erasable programmable read only memory (EPROM), or a solid state drive (SSD).

The memory 93 is used to store one or more instructions. Here, one or more instructions are stored in the memory 93 as a software module group. The processor 92 can execute the processes described in the above example embodiments by reading and executing the software module group from the memory 93.

Note that the memory 93 may include a memory built in the processor 92 in addition to a memory provided outside the processor 92. The memory 93 may include a storage disposed away from a processor configuring the processor 92. In this case, the processor 92 can access the memory 93 via an input/output (I/O) interface.

As described above, one or a plurality of processors included in each device in the above example embodiments execute one or a plurality of programs including an instruction group for causing a computer to execute an algorithm described with reference to the drawings. With the above processes, the signal processing method described in each example embodiment can be realized. The program may be stored by using various types of non-transitory computer readable media to be supplied to a computer. The non-transitory computer readable media include various types of tangible storage media. Examples of the non-transitory computer-readable medium include a magnetic recording medium (for example, a flexible disk, a magnetic tape, or a hard disk drive), an optical magnetic recording medium (for example, a magneto-optical disk), a CD-ROM (read only memory), a CD-R, a CD-R/W, and a semiconductor memory (for example, a mask ROM, a programmable ROM (PROM), an erasable PROM (EPROM), a flash ROM, or a random access memory (RAM). The program may be supplied to the computer by various types of transitory computer-readable media. Examples of the transitory computer-readable media include electrical signals, optical signals, and electromagnetic waves. The transitory computer-readable media may supply the program to the computer via a wired communication path such as electric wires and optical fibers, or a wireless communication path.

Some or all of the above-described example embodiments may be described as in the following Supplementary Notes, but are not limited to the following Supplementary Notes.

Supplementary Note 1

A notification device including:
accident occurrence detection means for detecting occurrence of an accident from a video captured by one or a plurality of cameras;
analysis means for analyzing the video to derive detailed information regarding an analysis target person involved with the accident;
determination means for determining a coping method for coping with the analysis target person on the basis of the detailed information; and notification means for notifying a notification target of the determined coping method.

Supplementary Note 2

The notification device according to Supplementary Note 1, further including:
notification target detection means for detecting the notification target present in a first region including a place where the accident has occurred,
in which the notification means notifies the notification target detected by the notification target detection means of the coping method.

Supplementary Note 3

The notification device according to Supplementary Note 2, in which
the notification target detection means detects that a first type of a candidate that is a candidate for the notification target is present in the first region and that a second type of a candidate that is a candidate for the notification target is present in a second region that is larger than the first region and includes the place where the accident has occurred, and
the notification means notifies, of the coping method, the notification target that is at least one of the first type of the candidate present in the first region detected by the notification target detection means or the second type of the candidate present in the second region detected by the notification target detection means.

Supplementary Note 4

The notification device according to Supplementary Note 2 or 3, in which the notification target includes at least one of a person or a vehicle.

Supplementary Note 5

The notification device according to any one of Supplementary Notes 2 to 4, in which
the determination means executes, as determination of the coping method, at least one of determining first aid or a procedure for the analysis target person or specifying a place of a medical device that is used in the first aid or the procedure and is present in a third region including the place where the accident has occurred, and
the notification means causes at least one of the determined first aid or procedure or the specified place of the medical device to be included in the coping method and notifies the notification target of the coping method.

Supplementary Note 6

The notification device according to any one of Supplementary Notes 2 to 5, in which
the notification target detection means determines that the candidate for the notification target appears in the video, thereby detecting the candidate as the notification target, and
the notification means notifies a terminal associated with the notification target detected by the notification target detection means of the coping method.

Supplementary Note 7

The notification device according to any one of Supplementary Notes 2 to 5, further including:
position information acquisition means for acquiring, from a terminal possessed by the candidate for the notification target, position information of the terminal, in which
the notification target detection means detects the notification target on the basis of the position information acquired by the position information acquisition means, and
the notification means notifies a terminal of the notification target detected by the notification target detection means of the coping method.

Supplementary Note 8

The notification device according to any one of Supplementary Notes 2 to 5, in which
the notification target detection means detects the notification target by specifying one or a plurality of base stations including the place where the accident has occurred in a cell of the base station, and
the notification means notifies a terminal of the notification target detected by the notification target detection means of the coping method.

Supplementary Note 9

The notification device according to Supplementary Note 1 or 2, in which
the notification target includes at least an organization related to medical care or emergencies,
the determination means determines the coping method to include at least one of a procedure for the analysis target person, a request for dispatch of a staff member to the place where the accident has occurred, a request for acceptance of the analysis target person, or preparation for a procedure, and
the notification means notifies the organization of the coping method.

Supplementary Note 10

The notification device according to any one of Supplementary Notes 1 to 9, in which
the analysis means specifies the analysis target person from among registrants on the basis of an authentication result of face authentication using a face image of the analysis target person appearing in the video and face information of the registrants, and derives personal information associated with the registrants as the detailed information, and
the determination means determines the coping method on the basis of the personal information.

Supplementary Note 11

The notification device according to Supplementary Note 10, in which
the personal information includes at least one of anamnesis, a clinical history, pregnancy status, an age, sex, a blood type, allergy information, a personal number, a primary medical institution, or an emergency contact.

Supplementary Note 12

The notification device according to Supplementary Note 10 or 11, in which the notification means determines the notification target on the basis of the personal information, and notifies the determined notification target.

Supplementary Note 13

The notification device according to any one of Supplementary Notes 1 to 12, in which the detailed information includes at least any one of a consciousness state, a respiratory state, a bleeding state, a fracture state, a burn state, a strong hit site, a spasm state, a walking state, a heartbeat state, a pulse state, or a body temperature state.

Supplementary Note 14

A notification system including:
one or a plurality of cameras;
a notification device that is connected to the one or plurality of cameras; and
one or a plurality of terminals that receive a notification from the notification device, in which
the notification device includes
accident occurrence detection means for detecting occurrence of an accident from a video captured by the one or plurality of cameras,
analysis means for analyzing the video to derive detailed information regarding an analysis target person involved with the accident,
determination means for determining a coping method for coping with the analysis target person on the basis of the detailed information, and
notification means for notifying the one or plurality of terminals of the determined coping method.

Supplementary Note 15

The notification system according to Supplementary Note 14, in which the one or plurality of cameras are provided at least at any of a traffic light, a roadside machine, an intersection, or a crossing.

Supplementary Note 16

A notification method of causing a notification device to execute:
an accident occurrence detection step of detecting occurrence of an accident from a video captured by one or a plurality of cameras;
an analysis step of analyzing the video to derive detailed information regarding an analysis target person involved with the accident;
a determination step of determining a coping method for coping with the analysis target person on the basis of the detailed information; and
a notification step of notifying a notification target of the determined coping method.

Supplementary Note 17

A non-transitory computer-readable medium storing a program for causing a computer to execute:
an accident occurrence detection step of detecting occurrence of an accident from a video captured by one or a plurality of cameras;
an analysis step of analyzing the video to derive detailed information regarding an analysis target person involved with the accident;
a determination step of determining a coping method for coping with the analysis target person on the basis of the detailed information; and
a notification step of notifying a notification target of the determined coping method.

Although the present invention has been described above with reference to the example embodiments, the present invention is not limited to the above. Various modifications that can be understood by those skilled in the art can be made to the configuration and details of the present invention within the scope of the invention.

REFERENCE SIGNS LIST

S1 to S4 NOTIFICATION SYSTEM
10 NOTIFICATION DEVICE
101 ACCIDENT OCCURRENCE DETECTION UNIT
102 ANALYSIS UNIT
103 DETERMINATION UNIT
104 NOTIFICATION UNIT
11 CAMERA
12 TERMINAL
20 CAMERA
201 IMAGING UNIT
202 TRANSMISSION/RECEPTION UNIT
203 STORAGE UNIT
21 MEC SERVER
211 ACCIDENT OCCURRENCE DETECTION UNIT
212 TRANSMISSION/RECEPTION UNIT
213 STORAGE UNIT
22, 32, 42, 52 NOTIFICATION SERVER
221 NOTIFICATION TARGET DETECTION UNIT
222 ANALYSIS UNIT
223 DETERMINATION UNIT
224 TRANSMISSION/RECEPTION UNIT
225 STORAGE UNIT
321 POSITION INFORMATION ACQUISITION UNIT
421 NOTIFICATION REGION SPECIFYING UNIT
23, 33, 43, 53 TERMINAL
231 OUTPUT UNIT
232 TRANSMISSION/RECEPTION UNIT
233 STORAGE UNIT
331 POSITION DETECTION UNIT
431 OUTPUT CONTROL UNIT
90 INFORMATION PROCESSING DEVICE
91 SIGNAL PROCESSING CIRCUIT
92 PROCESSOR
93 MEMORY

What is claimed is:
1. A notification device comprising:
at least one memory storing instructions; and
at least one processor configured to execute the instructions to:
detect occurrence of an accident from a video captured by one or a plurality of cameras;
analyze the video to derive detailed information regarding an analysis target person involved with the accident;
determine a coping method for coping with the analysis target person on the basis of the detailed information;
detect a candidate for a notification target present in a first region of the video including a place where the accident has occurred; and
notify the detected candidate for the notification target of the determined coping method;
analyze moving means or an average speed of the candidate; and
set the first region on the basis of the analysis.

2. The notification device according to claim 1, wherein the at least one processor is further configured to:
  detect that a first type of the candidate for the notification target is present in the first region and that a second type of the candidate is present in a second region that is larger than the first region and that includes the place where the accident has occurred, and
  notify the notification target that is at least one of the detected first type or the detected second type.

3. The notification device according to claim 1, wherein the notification target includes at least one of a person or a vehicle.

4. The notification device according to claim 1, wherein the at least one processor is further configured to:
  determine the coping method by at least one of determining first aid or a procedure for the analysis target person or specifying a place of a medical device that is used in the first aid or the procedure and is present in a third region including the place where the accident has occurred; and
  include at least one of the determined first aid or procedure or the specified place of the medical device in the coping method.

5. The notification device according to claim 1, wherein the at least one processor is further configured to:
  acquire, from a terminal of the candidate for the notification target, position information of the terminal;
  detect the notification target on the basis of the acquired position information; and
  notify the terminal of the detected candidate for the notification target of the coping method.

6. The notification device according to claim 1, wherein the at least one processor is further configured to:
  detect the candidate for the notification target by specifying one or a plurality of base stations including the place where the accident has occurred in a cell of the base station; and
  notify a terminal of the detected candidate for the notification target of the coping method.

7. The notification device according to claim 1, wherein the notification target includes at least an organization related to medical care or emergencies, and the at least one processor is further configured to:
  determine the coping method to include at least one of a procedure for the analysis target person, a request for dispatch of a staff member to the place where the accident has occurred, a request for acceptance of the analysis target person, or preparation for a procedure; and
  notify the organization of the coping method.

8. The notification device according to claim 1, wherein the detailed information includes at least any one of a consciousness state, a respiratory state, a bleeding state, a fracture state, a burn state, a strong hit site, a spasm state, a walking state, a heartbeat state, a pulse state, or a body temperature state.

9. The notification device according to claim 1, wherein the at least one processor is further configured to:
  change a size of the first region according to whether a terminal associated with the notification target is owned by an individual or mounted on a vehicle.

10. The notification device according to claim 1, wherein the at least one processor is further configured to:
  exclude a different candidate for the notification target that satisfies a certain condition from being the notification target on the basis of map information of periphery of a site of the accident.

11. The notification device according to claim 1, wherein the at least one processor is further configured to:
  specify the analysis target person from among registrants on the basis of an authentication result of face authentication using a face image of the analysis target person appearing in the video and face information of the registrants;
  derive personal information associated with the registrants as the detailed information, and
  determine the coping method on the basis of the personal information.

12. The notification device according to claim 11, wherein the personal information includes at least one of anamnesis, a clinical history, pregnancy status, an age, sex, a blood type, allergy information, a personal number, a primary medical institution, or an emergency contact.

13. The notification device according to claim 11, wherein the at least one processor is further configured to:
  determine the candidate for the notification target on the basis of the personal information.

14. A notification method for a notification device, comprising:
  detecting occurrence of an accident from a video captured by one or a plurality of cameras;
  analyzing the video to derive detailed information regarding an analysis target person involved with the accident;
  determining a coping method for coping with the analysis target person on the basis of the detailed information;
  detecting a candidate for a notification target present in a first region of the video including a place where the accident has occurred; and
  notifying the detected candidate for the notification target of the determined coping method;
  analyzing moving means or an average speed of the candidate; and
  setting the first region on the basis of the analysis.

15. A non-transitory computer-readable medium storing a program executable by a computer to perform processing comprising:
  detecting occurrence of an accident from a video captured by one or a plurality of cameras;
  analyzing the video to derive detailed information regarding an analysis target person involved with the accident;
  determining a coping method for coping with the analysis target person on the basis of the detailed information;
  detecting a candidate for a notification target present in a first region of the video including a place where the accident has occurred; and
  notifying the detected candidate for the notification target of the determined coping method;
  analyzing moving means or an average speed of the candidate; and
  setting the first region on the basis of the analysis.

* * * * *